US011840617B2

(12) United States Patent
Mitamura et al.

(10) Patent No.: US 11,840,617 B2
(45) Date of Patent: Dec. 12, 2023

(54) STABILIZER COMPOSITION, VINYL CHLORIDE RESIN COMPOSITION CONTAINING SAME, AND ARTICLE MOLDED THEREFROM

(71) Applicant: ADEKA CORPORATION, Tokyo (JP)

(72) Inventors: Ryusuke Mitamura, Tokyo (JP); Hiroshi Nishimura, Tokyo (JP); Kazumasa Tanaka, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 16/966,727

(22) PCT Filed: Jan. 30, 2019

(86) PCT No.: PCT/JP2019/003254
§ 371 (c)(1),
(2) Date: Jul. 31, 2020

(87) PCT Pub. No.: WO2019/151355
PCT Pub. Date: Aug. 8, 2019

(65) Prior Publication Data
US 2020/0362145 A1    Nov. 19, 2020

(30) Foreign Application Priority Data
Feb. 2, 2018 (JP) ................ 2018-017176

(51) Int. Cl.
| | |
|---|---|
| *C08K 13/02* | (2006.01) |
| *C08K 3/26* | (2006.01) |
| *C08K 5/07* | (2006.01) |
| *C08K 5/13* | (2006.01) |
| *C08K 5/3432* | (2006.01) |
| *C08K 5/524* | (2006.01) |
| *C09K 15/02* | (2006.01) |
| *C09K 15/06* | (2006.01) |
| *C09K 15/08* | (2006.01) |
| *C09K 15/18* | (2006.01) |

(52) U.S. Cl.
CPC ............. *C08K 13/02* (2013.01); *C08K 3/26* (2013.01); *C08K 5/07* (2013.01); *C08K 5/13* (2013.01); *C08K 5/3432* (2013.01); *C08K 5/524* (2013.01); *C09K 15/02* (2013.01); *C09K 15/06* (2013.01); *C09K 15/08* (2013.01); *C09K 15/18* (2013.01); *C08K 2003/265* (2013.01); *C08K 2201/014* (2013.01)

(58) Field of Classification Search
CPC ........ C08K 13/02; C08K 5/0091; C08K 3/26; C08K 5/07; C08K 5/3432; C08K 5/098; C08K 5/3435; C08K 5/13; C08K 5/06; C08K 5/524; C08K 5/005; C08K 2003/2296; C08K 2003/265; C08K 2201/014; C08L 27/06; C09K 15/08; C09K 15/02; C09K 15/06; C09K 15/30; C09K 15/18
See application file for complete search history.

(56) References Cited

U.S. PATENT DOCUMENTS

| | | | |
|---|---|---|---|
| 5,244,949 A | 9/1993 | Wirth et al. | |
| 5,283,273 A | 2/1994 | Sander et al. | |
| 5,350,785 A | 9/1994 | Sander et al. | |
| 2002/0013390 A1 | 1/2002 | Gugumus | |
| 2003/0162867 A1 | 8/2003 | Gugumus | |
| 2011/0319541 A1* | 12/2011 | Nakamae ................ | C08L 27/06 524/399 |
| 2012/0149809 A1 | 6/2012 | Odagiri et al. | |
| 2017/0283594 A1 | 10/2017 | Mitamura et al. | |

FOREIGN PATENT DOCUMENTS

| | | |
|---|---|---|
| CN | 102482472 A | 5/2012 |
| CN | 106604963 A | 4/2017 |
| EP | 2 676 997 A1 | 12/2013 |
| JP | 62-59745 B2 | 12/1987 |
| JP | 4-332746 A | 11/1992 |
| JP | 5-287147 A | 11/1993 |
| JP | 6-49273 A | 2/1994 |
| JP | 2623271 B2 | 6/1997 |

(Continued)

OTHER PUBLICATIONS

English language machine translation of JP H10-219056 (Year: 1998).*
Chinese Office Action and Search Report, dated Mar. 2, 2021, for Chinese Application No. 201980011379.7.
International Search Report (PCT/ISA/210) issued in PCT/JP2019/003254 dated May 14, 2019.
Written Opinion (PCT/ISA/237) issued in PCT/JP2019/003254 dated May 14, 2019.
George Wypych (Canada), Handbook of Material Weathering (3rd Edition), Beijing: China Petrochemical Press, pp. 465 and 467, May 2004.
Office Action dated May 12, 2022, in Chinese Patent Application No. 201980011379.7.

(Continued)

*Primary Examiner* — Angela C Scott
(74) *Attorney, Agent, or Firm* — Birch, Stewart, Kolasch & Birch, LLP

(57) ABSTRACT

Provided are: a stabilizer composition capable of imparting a vinyl chloride resin with excellent thermal stability, coloration resistance, and thermal coloration resistance; a vinyl chloride resin composition containing the same and a molded article of the composition. The stabilizer composition contains, with respect to 100 parts by mass of a component (A): 5 to 700 parts by mass of a component (B) and 5 to 200 parts by mass of a component (C). The component (A) is at least one organic acid zinc salt, the component (B) is at least one selected from the group consisting of organic acid barium salts, overbased barium carbonates, organic acid calcium salts and overbased calcium carbonates, and the component (C) is at least one hindered amine-based light stabilizer.

11 Claims, No Drawings

(56) References Cited

FOREIGN PATENT DOCUMENTS

| JP | 10-88129 A | 4/1998 |
|---|---|---|
| JP | 10-219056 A | 8/1998 |
| JP | 2000-309671 A | 11/2000 |
| JP | 3660562 B2 | 6/2005 |
| JP | 2005-132943 A | 6/2009 |
| JP | 2013-10634 A | 1/2013 |

OTHER PUBLICATIONS

Zhaode Sui, Jie Li, Yujie Zhang et al., Light Stabilizers and Application Technology Thereof [M]. Beijing: China Light Industry Press, Jan. 2010.

Extended European Search Report dated Oct. 8, 2021, in European Patent Application No. 19747887.8.

* cited by examiner

STABILIZER COMPOSITION, VINYL CHLORIDE RESIN COMPOSITION CONTAINING SAME, AND ARTICLE MOLDED THEREFROM

TECHNICAL FIELD

The present invention relates to a stabilizer composition, a vinyl chloride resin composition containing the same, and a molded article of the composition. More particularly, the present invention relates to: a stabilizer composition capable of imparting a vinyl chloride resin with excellent thermal stability, coloration resistance, and thermal coloration resistance; a vinyl chloride resin composition containing the same; and a molded article of the composition.

BACKGROUND ART

Vinyl chloride resins are used in a variety of applications since not only they are excellent in flame retardancy, chemical resistance, mechanical stability, transparency, adhesiveness, printability and the like but also their hardness can be easily modified from hard to soft with an addition of a plasticizer. Particularly, hard vinyl chloride resin compositions containing no plasticizer at all and semi-hard vinyl chloride resin compositions containing a small amount of a plasticizer have excellent rigidity and are thus widely used in building materials and the like. Therefore, such vinyl chloride resin compositions are required to exhibit their performance at a higher level in terms of thermal stability, coloration resistance, thermal coloration resistance, weather resistance and the like, not only during processing when they are exposed to a high temperature and a high pressure but also as molded articles.

Further, as for hard transparent molded articles, vinyl chloride resins are also used as extremely versatile resins in containers, industrial boards, decorative plates, films, sheets and the like that require glass-like transparency. On the other hand, chloride resins are known to have drawbacks in that they are not sufficiently stable against light and heat, and that they are likely to be degraded mainly due to dehydrohalogenation when they are heat-molded or used as products.

In order to satisfy these performance requirements and overcome the drawbacks, it is conventionally proposed, as in Patent Documents 1 to 3, to improve the stability of a vinyl chloride resin by incorporating a variety of stabilizers such as an organic acid metal salt, an organic tin compound, an organic phosphite compound, and epoxy compound, a β-diketone compound, an antioxidant, and an ultraviolet absorber.

However, even in a vinyl chloride resin composition containing such stabilizers, degradation caused by a reduction in the molecular weight of its vinyl chloride resin and dehydrohalogenation when they are heat-molded or used as products is not completely inhibited. Moreover, a problem has been found that a vinyl chloride resin composition is colored as a result of a reduction in the molecular weight of its vinyl chloride resin or generation of hydrogen chloride. Under these circumstances, Patent Document 4 proposes to incorporate a hindered amine-based light stabilizer into a vinyl chloride resin.

RELATED ART DOCUMENTS

Patent Documents

[Patent Document 1] JP3660562B2
[Patent Document 2] JP2623271B2
[Patent Document 3] JP2000-309671A
[Patent Document 4] JPS62-59745B2

SUMMARY OF THE INVENTION

Problems to be Solved by the Invention

However, a hindered amine-based light stabilizer is used for improving the weather resistance of a vinyl chloride resin, and the improvement in the thermal stability, the coloration resistance, and the thermal coloration resistance of a vinyl chloride resin have not been investigated sufficiently. Therefore, at present, there is still room for investigation with regard to the inhibition of deterioration in the quality of a vinyl chloride resin composition caused by heating, processing and use.

In view of the above, an object of the present invention is to provide: a stabilizer composition capable of imparting a vinyl chloride resin with excellent thermal stability, coloration resistance, and thermal coloration resistance; a vinyl chloride resin composition containing the same; and a molded article of the composition. Another object of the present invention is to provide: in applications where transparency is required, a stabilizer composition capable of imparting a vinyl chloride resin with excellent transparency in addition to the above-described effects; a vinyl chloride resin composition containing the same; and a molded article of the composition.

Means for Solving the Problems

The present inventors intensively studied to solve the above-described problems and consequently discovered that the problems can be solved by adopting the below-described constitution, thereby completing the present invention.

That is, the stabilizer composition of the present invention is a stabilizer composition containing, with respect to 100 parts by mass of a component (A): 5 to 700 parts by mass of a component (B); and 5 to 200 parts by mass of a component (C), the stabilizer composition being characterized in that:
the component (A) is at least one organic acid zinc salt;
the component (B) is at least one selected from the group consisting of organic acid barium salts, overbased barium carbonates, organic acid calcium salts, and overbased calcium carbonates; and
the component (C) is at least one hindered amine-based light stabilizer.

It is preferred that the stabilizer composition of the present invention further contains 5 to 300 parts by mass of at least one β-diketone compound as a component (D) with respect to 100 parts by mass of the component (A). It is also preferred that the stabilizer composition of the present invention further contains 5 to 700 parts by mass of at least one phosphite compound as a component (E) with respect to 100 parts by mass of the component (A). Further, it is preferred that the stabilizer composition of the present invention further contains 5 to 200 parts by mass of at least one phenolic antioxidant as a component (F) with respect to 100 parts by mass of the component (A). In the stabilizer composition of the present invention, the component (C) preferably has a base dissociation index pKb in a range of 3.0 to less than 11.0. In the stabilizer composition of the present invention, the component (B) is preferably at least one organic acid barium salt or overbased barium carbonate. Moreover, in the stabilizer composition of the present invention, the barium content in the component (B) with respect to the zinc content in the component (A) is preferably in a range of 0.1 to 20.0 in terms of molar ratio.

The vinyl chloride resin composition of the present invention is characterized by containing a vinyl chloride resin and the stabilizer composition of the present invention.

In the vinyl chloride resin composition of the present invention, the content of the stabilizer composition is preferably 0.3 to 15.0 parts by mass with respect to 100 parts by mass of the vinyl chloride resin.

The molded article of the present invention is characterized by being obtained from the vinyl chloride resin composition of the present invention.

Effects of the Invention

According to the present invention, a stabilizer composition capable of imparting a vinyl chloride resin with excellent thermal stability, coloration resistance, and thermal coloration resistance, a vinyl chloride resin composition containing the same, and a molded article of the composition can be provided. Further, in applications where transparency is required, a stabilizer composition capable of imparting a vinyl chloride resin with excellent transparency in addition to the above-described effects, a vinyl chloride resin composition containing the same, and a molded article of the composition can be provided.

MODE FOR CARRYING OUT THE INVENTION

Embodiments of the present invention will now be described in detail.

First, the stabilizer composition of the present invention will be described. The stabilizer composition of the present invention is a stabilizer composition that contains, with respect to 100 parts by mass of a component (A): 5 to 700 parts by mass of a component (B); and 5 to 200 parts by mass of a component (C). The component (A) is at least one organic acid zinc salt; the component (B) is at least one selected from the group consisting of organic acid barium salts, overbased barium carbonates, organic acid calcium salts, and overbased calcium carbonates; and the component (C) is at least one hindered amine-based light stabilizer.

First, the component (A) will be described.

The component (A) of the stabilizer composition of the present invention is at least one organic acid zinc salt. Examples of the organic acid zinc salt include zinc salts of organic carboxylic acids, phenols, or organic phosphoric acids.

Examples of the organic carboxylic acids include: monovalent carboxylic acids, such as acetic acid, propionic acid, butyric acid, valeric acid, caproic acid, enanthic acid, caprylic acid, pelargonic acid, 2-ethylhexanoic acid, neodecanoic acid, capric acid, undecanoic acid isoundecylic acid, lauric acid, isolauric acid, tridecanoic acid, myristic acid, isomyristic acid, palmitic acid, isopalmitic acid, isostearic acid, stearic acid, 12-hydroxystearic acid, behenic acid, montanoic acid, vasatic acid, benzoic acid, monochlorobenzoic acid, 4-tert-butylbenzoic acid, dimethylhydroxybenzoic acid, 3,5-di-tert-butyl-4-hydroxybenzoic acid, o-toluic acid, m-toluic acid, p-toluic acid, toluic acid, dimethylbenzoic acid, 2,4-dimethylbenzoic acid, 3,5-dimethylbenzoic acid, 2,4,6-trimethylbenzoic acid, ethylbenzoic acid, 2-ethylbenzoic acid, 3-ethylbenzoic acid, 4-ethylbenzoic acid, 2,4,6-triethylbenzoic acid, 4-isopropylbenzoic acid, n-propylbenzoic acid, aminobenzoic acid, N,N-dimethylaminobenzoic acid, acetoxybenzoic acid, salicylic acid, p-tert-octylsalicylic acid, elaidic acid, oleic acid, linoleic acid, linolenic acid, myristoleic acid, palmitoleic acid, eleostearic acid, eicosenoic acid, eicosadienoic acid, eicosatrienoic acid, eicosatetraenoic acid, arachidonic acid, docosapentaenoic acid, docosahexaenoic acid, ricinoleic acid, thioglycolic acid, mercaptopropionic acid, and octyl mercaptopropionic acid; divalent carboxylic acids, such as oxalic acid, malonic acid, succinic acid, glutaric acid, adipic acid, pimelic acid, suberic acid, azelaic acid, sebacic acid, phthalic acid isophthalic acid, terephthalic acid, hydroxyphthalic acid, chlorophthalic acid, aminophthalic acid, maleic acid, fumaric acid, citraconic acid, mesaconic acid, itaconic acid, aconitic acid and thiodipropionic acid, and monoester or monoamide compounds of these divalent carboxylic acids; and di- or tri-ester compounds of trivalent or tetravalent carboxylic acids, such as butanetricarboxylic acid, butanetetracarboxylic acid, hemimellitic acid, trimellitic acid, mellophanic acid, and pyromellitic acid.

Examples of the phenols include tert-butyl phenol, nonyl phenol, dinonyl phenol, cyclohexyl phenol, phenyl phenol, octyl phenol, phenol, cresol, xylenol, n-butyl phenol, isoamyl phenol, ethyl phenol, isopropyl phenol, isooctyl phenol, 2-ethylhexyl phenol, tert-nonyl phenol, decyl phenol, tert-octyl phenol, isohexyl phenol, octadecyl phenol, diisobutyl phenol, methylpropyl phenol, diamyl phenol, methylisohexyl phenol, and methyl-tert-octyl phenol.

Examples of the organic phosphoric acids include mono- or di-octylphosphoric acid, mono- or di-dodecyl phosphoric acid, mono- or di-octadecyl phosphoric acid, mono- or di-(nonylphenyl)phosphoric acid, nonylphenyl phosphonate, and stearyl phosphonate.

The organic acid zinc salt, which is the component (A) of the stabilizer composition of the present invention, may be an acidic salt, a neutral salt, a basic salt, or an overbased complex obtained by neutralizing a part or the entirety of the base of a basic salt with carbonic acid.

Further, the organic acid zinc salt, which is the component (A) of the stabilizer composition of the present invention, may be constituted by two or more organic acids. For example, in the case of a zinc salt formed by monovalent organic acids, the same organic acid may constitute an anionic moiety and form a salt with divalent zinc constituting a cationic moiety, or two different monovalent organic acids may each constitute an anionic moiety and form a salt with divalent zinc constituting a cationic moiety.

From the standpoints of thermal stability, coloration resistance and thermal coloration resistance, the organic acid zinc salt of the component (A) is preferably zinc benzoate, zinc toluate, zinc 4-tert-butyl benzoate, zinc stearate, zinc laurate, zinc versatate, zinc octylate, zinc oleate, zinc palmitate, or zinc myristate. Thereamong, from the standpoints of thermal stability, coloration resistance and thermal coloration resistance, a zinc salt of an aromatic carboxylic acid is more preferred and, specifically, zinc benzoate, zinc toluate, or zinc 4-tert-butyl benzoate is still more preferred. Further, in applications where transparency is required, a zinc salt of an aromatic carboxylic acid is preferred and, specifically, zinc benzoate, zinc toluate, or zinc 4-tert-butyl benzoate is more preferred. The organic acid zinc salt of the component (A) may be used individually, or two or more thereof may be used in combination.

Next, the component (B) will be described.

The component (B) of the stabilizer composition of the present invention is at least one selected from the group consisting of organic acid barium salts, overbased barium carbonates, organic acid calcium salts, and overbased calcium carbonates.

Examples of the organic acid barium salts include barium salts of organic carboxylic acids, phenols, or organic phosphoric acids.

Examples of the organic carboxylic acids include: monovalent carboxylic acids, such as acetic acid, propionic acid, butyric acid, valeric acid, caproic acid, enanthic acid, caprylic acid, pelargonic acid, 2-ethylhexanoic acid, neodecanoic acid, capric acid, undecanoic acid, isoundecylic acid, lauric acid, isolauric acid, tridecanoic acid, myristic acid, isomyristic acid, palmitic acid, isopalmitic acid, isostearic acid, stearic acid, 12-hydroxystearic acid, behenic acid, montanoic acid, versatic acid, benzoic acid, monochlorobenzoic acid, 4-tert-butylbenzoic acid, dimethylhydroxybenzoic acid, 3,5-di-tert-butyl-4-hydroxybenzoic acid, o-toluic acid, m-toluic acid, p-toluic acid, toluic acid, dimethylbenzoic acid, 2,4-dimethylbenzoic acid, 3,5-dimethylbenzoic acid 2,4,6-trimethylbenzoic acid, ethylbenzoic acid, 2-ethylbenzoic acid, 3-ethylbenzoic acid, 4-ethylbenzoic acid, 2,4,6-triethylbenzoic acid, 4-isopropylbenzoic acid, n-propylbenzoic acid, aminobenzoic acid, N,N-dimethylaminobenzoic acid, acetoxybenzoic acid, salicylic acid, p-tert-octylsalicylic acid, elaidic acid, oleic acid, linoleic acid, linolenic acid, myristoleic acid, palmitoleic acid, eleostearic acid, eicosenoic acid, eicosadienoic acid, eicosatrienoic acid, eicosatetraenoic acid, arachidonic acid, docosapentaenoic acid, docosahexaenoic acid, ricinoleic acid, thioglycolic acid, mercaptopropionic acid, and octyl mercaptopropionic acid; divalent carboxylic acids, such as oxalic acid, malonic acid, succinic acid, glutaric acid, adipic acid, pimelic acid, suberic acid, azelaic acid, sebacic acid, phthalic acid, isophthalic acid, terephthalic acid, hydroxyphthalic acid, chlorophthalic acid, aminophthalic acid, maleic acid, fumaric acid, citraconic acid, mesaconic acid, itaconic acid, aconitic acid and thiodipropionic acid, and monoester or monoamide compounds of these divalent carboxylic acids, and di- or tri-ester compounds of trivalent or tetravalent carboxylic acids, such as butanetricarboxylic acid, butanetetracarboxlic acid, hemimellitic acid, trimellitic acid, mellophanic acid, and pyromellitic acid.

Examples of the phenols include tert-butyl phenol, nonyl phenol, dinonyl phenol, cyclohexyl phenol, phenyl phenol, octyl phenol, phenol, cresol, xylenol, n-butyl phenol, isoamyl phenol, ethyl phenol, isopropyl phenol, isooctyl phenol, 2-ethylhexyl phenol, tert-nonyl phenol, decyl phenol, tert-octyl phenol, isohexyl phenol, octadecyl phenol, diisobutyl phenol, methylpropyl phenol, diamyl phenol, methylisohexyl phenol, and methyl-tert-octyl phenol.

Examples of the organic phosphoric acids include mono- or di-octylphosphoric acid, mono- or di-dodecyl phosphoric acid, mono- or di-octadecyl phosphoric acid, mono- or di-(nonylphenyl)phosphoric acid, nonylphenyl phosphonate, and stearyl phosphonate.

An organic acid barium salt, which is the component (B) of the stabilizer composition of the present invention, may be constituted by two or more organic acids. For example, in the case of a barium salt formed by monovalent organic acids, the same organic acid may constitute an anionic moiety and form a salt with divalent zinc constituting a cationic moiety, or two different monovalent organic acids may each constitute an anionic moiety and form a salt with divalent barium constituting a cationic moiety.

Such an organic acid barium salt may be used individually, or two or more thereof may be used in combination. Further, the organic acid barium salt, which is the component (B) of the stabilizer composition of the present invention, may be an acidic salt, a neutral salt, or a basic salt.

The term "overbased barium carbonate" used herein refers to a liquid overbased carboxylate-carbonate complex of barium. This complex, which is different from a simple mixture of normal barium carboxylate and barium carbonate, is formed by some sort of interaction therebetween and characteristically assumes a homogeneous liquid state in an organic solvent while having a high metal content. This complex is constituted by, as its constituents, normal barium carboxylate, barium carbonate and a complex salt of barium carboxylate and barium carbonate, and normal barium carboxylate and the complex salt of barium carboxylate and barium carbonate are centered around barium carbonate to form a so-called micelle-like structure, thereby allowing the complex to assume a homogeneous liquid state in an organic solvent. Such a liquid overbased carboxylate-carbonate complex of barium can be produced by, for example, the production method described in JP2004-238364A.

As the liquid overbased carboxylate-carbonate complex of barium, a variety of commercially available complexes can be directly used. Representative examples thereof include "PlastiStab™ 2116" (overbased barium oleate-carbonate complex: specific gravity=1.42 to 1.53, Ba=33 to 36%), "PlastiStab™ 2513" (overbased barium oleate-carbonate complex: specific gravity=1.41 to 1.52, Ba=33 to 36%) and "PlastiStab™ 2508" (overbased barium oleate-carbonate complex: specific gravity=1.39 to 1.51, Ba=33 to 36%), which are manufactured by AM Stabilizers Corporation, U.S.

These overbased barium carbonates may be used individually, or two or more thereof may be used in combination.

Examples of the organic acid calcium salts include calcium salts of organic carboxylic acids, phenols, or organic phosphoric acids.

Examples of the organic carboxylic acids include the same ones as those exemplified above for barium salts. Examples of the phenols also include the same ones as those exemplified above for barium salts. Moreover, examples of the organic phosphoric acids include the same ones as those exemplified above for barium salts.

An organic acid calcium salt, which is the component (B) of the stabilizer composition of the present invention, may be constituted by two or more organic acids. For example, in the case of a calcium salt formed by monovalent organic acids, the same organic acid may constitute an anionic moiety and form a salt with divalent calcium constituting a cationic moiety, or two different monovalent organic acids may each constitute an anionic moiety and form a salt with divalent calcium constituting a cationic moiety.

Such an organic acid calcium salt may be used individually, or two or more thereof may be used in combination. Further, the organic acid calcium salt, which is the component (B) of the stabilizer composition of the present invention, may be an acidic salt, a neutral salt, or a basic salt.

The term "overbased calcium carbonate" used herein refers to a liquid overbased carboxylate-carbonate complex of calcium. This complex, which is different from a simple mixture of normal calcium carboxylate and calcium carbonate, is formed by some sort of interaction therebetween and characteristically assumes a homogeneous liquid state in an organic solvent while having a high metal content. This complex is constituted by, as its constituents, normal calcium carboxylate, calcium carbonate and a complex salt of calcium carboxylate and calcium carbonate, and normal calcium carboxylate and the complex salt of calcium carboxylate and calcium carbonate are centered around calcium carbonate to form a so-called micelle-like structure, thereby allowing the complex to assume a homogeneous liquid state in an organic solvent.

Such a liquid overbased carboxylate-carbonate complex of calcium can be produced in the same manner as the above-described liquid overbased carboxylate-carbonate complex of barium. Further, a variety of commercially available complexes can be directly used as well. Representative examples thereof include "PlastiStab™ 2265" (overbased calcium oleate-carbonate complex: specific gravity=1.04 to 1.09, Ca=10%) manufactured by AM Stabilizers Corporation, U.S.

These overbased calcium carbonates may be used individually, or two or more thereof may be used in combination.

As the component (B) of the stabilizer composition of the present invention, the above-described organic acid barium salts, overbased barium carbonates, organic acid calcium salts, and overbased calcium carbonates may be used individually, or two or more thereof may be used in combination.

From the standpoints of thermal stability, coloration resistance and thermal coloration resistance, the component (B) of the stabilizer composition of the present invention is preferably an organic acid barium salt or an overbased barium carbonate, most preferably an overbased barium carbonate.

In an application where transparency is required, the component (B) is preferably a barium salt of an aromatic carboxylic acid or an overbased barium carbonate, most preferably an overbased barium carbonate.

The content of the component (B) in the stabilizer composition of the present invention is 5 to 700 parts by mass with respect to 100 parts by mass of the organic acid zinc salt of the component (A) and, from the standpoints of thermal stability, coloration resistance and thermal coloration resistance, the content of the component (B) is preferably 25 to 600 parts by mass, more preferably 50 to 500 parts by mass.

Next, the component (C) will be described.

The component (C) of the stabilizer composition of the present invention is at least one hindered amine-based light stabilizer. The hindered amine-based light stabilizer is not particularly restricted as long as it is a conventionally known hindered amine-based light stabilizer, and examples thereof include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)•bis(tridecyl)-1,2,3,4-butanetetracarboxylate, bis(1,2,2,6,6-pentamethyl-4-piperidyl)•bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 1,2,2,6,6-tetramethyl-4-piperidyl methacrylate, poly[{6-(1,1,3,3-tetramethylbutyl)amino-1,3,5-triazine-2,4-diyl}{(2,2,6,6-tetramethyl-4-piperidyl)imino}hexamethylene {(2,2,6,6-tetramethyl-4-piperidyl)imino}], 1,2,3,4-butanecarboxylic acid/2,2-bis(hydroxymethyl)-1,3-propanediol/3-hydroxy-2,2-dimethylpropanal/1,2,2,6,6-pentamethyl-4-piperidinyl ester polycondensate, bis(1,2,2,6,6-pentamethyl-4-piperidyl)=decane dioate/methyl=1,2,2,6,6-pentamethyl-4-piperidyl=sebacate mixture, 2,2,6,6-tetramethyl-4-piperidyl methacrylate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane, 1,6,11-tris[2,4-bis(N-butyl-N-(1,2,2,6,6-pentamethyl-4-piperidyl)amino)-s-triazine-6-ylamino]undecane, 3,9-bis[1,1-dimethyl-2-{tris(2,2,6,6-tetramethyl-4-piperidyloxycarbonyl)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane, bis(1-undecyloxy-2,2,6,6-tetramethylpiperidin-4-yl)carbonate, 2,2,6,6-tetramethyl-4-piperidyl hexadecanoate, and 2,2,6,6-tetramethyl-4-piperidyl octadecanoate.

The hindered amine-based light stabilizer of the component (C) may be used individually, or two or more thereof may be used in combination.

Further, from the standpoints of thermal stability, coloration resistance and thermal coloration resistance, the component (C) is preferably a compound having a group represented by the following Formula (1):

In Formula (1), $R^1$ represents a hydrogen atom, a hydroxy group, an alkyl group having 1 to 30 carbon atoms, an alkoxy group having 1 to 30 carbon atoms, a hydroxyalkyl group having 1 to 30 carbon atoms, a hydroxyalkoxy group having 1 to 30 carbon atoms, an alkenyl group having 2 to 30 carbon atoms, or an oxy radical, which alkyl group, alkoxy group, hydroxyalkyl group, hydroxyalkoxy group and alkenyl group are optionally interrupted by one or plural oxygen atoms or carbonyl groups. Further, the group of Formula (1) is bound at the position of *. The compound may contain one or plural groups of Formula (1).

The alkyl group having 1 to 30 carbon atoms, which may be represented by $R^1$ in Formula (1), is, for example, a linear alkyl group or a branched alkyl group. Examples of the linear alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, a pentacosyl group, a hexacosyl group, a heptacosyl group, an octacosyl group, a nonacosyl group and a triacontyl group, and examples of the branched alkyl group include the above-described linear alkyl groups which are substituted with one or more alkyl groups having 1 to 9 carbon atoms.

Examples of the alkoxy group having 1 to 30 carbon atoms, which may be represented by $R^1$ in Formula (1), include alkoxy groups that correspond to the above-exemplified alkyl groups.

Examples of the hydroxyalkyl group having 1 to 30 carbon atoms, which may be represented by $R^1$ in Formula (1), include hydroxyalkyl groups that correspond to the above-exemplified alkyl groups.

Examples of the hydroxyalkoxy group having 1 to 30 carbon atoms, which may be represented by $R^1$ in Formula (1), include hydroxyalkoxy groups that correspond to the above-exemplified alkoxy groups.

Examples of the alkenyl group having 2 to 30 carbon atoms, which may be represented by $R^1$ in Formula (1), include an ethenyl group, a propenyl group, a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, an eicosenyl group, a heneicosenyl group, a docosenyl group, a tricosenyl group, a tetracosenyl group, a pentacosenyl group, a hexacosenyl group, a heptacosenyl group, an octacosenyl group, a nonacosenyl group, and a triacontenyl group, as well as alkadienyl groups and alkatrienyl groups.

In the group represented by Formula (1), from the standpoints of thermal stability, coloration resistance and thermal coloration resistance, $R^1$ is preferably a hydrogen atom or an alkyl group having 1 to 30 carbon atoms, more preferably an alkyl group having 1 to 30 carbon atoms, still more preferably an alkyl group having 1 to 4 carbon atoms, most preferably a methyl group.

Examples of the component (C) having the group represented by Formula (1) include: those in which $R^1$ of Formula (1) is a hydrogen atom, such as 2,2,6,6-tetramethyl-4-piperidyl stearate 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate bis(2,2,6,6-tetramethyl-4-piperidyl)•bis(tridecyl)-1,2,3,4-butanetetracarboxylate, poly[{6-(1,1,3,3-tetramethylbutyl)amino-1,3,5-triazine-2,4-diyl}{(2,2,6,6-tetramethyl-4-piperidyl)imino}hexamethylene {(2,2,6,6-tetramethyl-4-piperidyl)imino}], 2,2,6,6-tetramethyl-4-piperidyl methacrylate, 1,6-bis(2,2,6,6-tetramethyl-4-piperidylamino) hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4bis(N-butyl-N-(2,2,6,6-tetramethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane 3,9-bis[1,1-dimethyl-2-{tris(2,2,6,6-tetramethyl-4-piperidyloxycarbonyl)butylcarbonyloxy}ethyl]-2,4,8,10-tetraoxaspiro[5.5]undecane, 2,2,6,6-tetramethyl-4-piperidylhexadecanoate, and 2,2,6,6-tetramethyl-4-piperidyloctadecanoate; those in which $R^1$ of Formula (1) is a methyl group, such as 1,2,2,6,6-pentamethyl-4-piperidyl stearate, bis(1,2,2,6,6-pentamethyl-4-piperidyl)sebacate, tetrakis(1,2,2,6,6-pentamethyl-4-piperidyl)-1,2,3,4-butanetetracarboxylate, bis(1,2,6,6-pentamethyl-4-piperidyl)•bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 1,2,2,6,6-pentamethyl-4-piperidyl methacrylate, 1,2,3,4-butanecarboxylic acid/2,2-bis(hydroxymethyl)-1,3-propanediol/3-hydroxy-2,2-dimethylpropanal/1,2,2,6,6-pentamethyl-4-piperidinyl ester polycondensate, bis(1,2,2,6,6-pentamethyl-4-piperidyl)=decanedioate/methyl=1,2,2,6,6-pentamethyl-4-piperidyl=sebacate mixture, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(1,2,2,6,6-pentamethyl-4-piperidyl)amino)-s-triazine-6-ylamino]undecane, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane, 1,2,2,6,6-pentamethyl-4-piperidylhexadecanoate, and 1,2,2,6,6-pentamethyl-4-piperidyloctadecanoate; and those in which $R^1$ of Formula (1) is an alkoxy group having 1 to 30 carbon atoms, such as bis(1-octoxy-2,2,6,6-tetramethyl-4-piperidyl)sebacate and bis(1-undecyloxy-2,2,6,6-tetramethylpiperidin-4-yl)carbonate. Thereamong, from the standpoints of thermal stability, coloration resistance and thermal coloration resistance, a component having the group represented by Formula (1) in which $R^1$ is a hydrogen atom or a methyl group is preferred, and a component having the group represented by Formula (1) in which $R^1$ is a methyl group is more preferred.

From the standpoints of the thermal stability, coloration resistance and thermal coloration resistance of the stabilizer composition, the hindered amine-based light stabilizer of the component (C) has a base dissociation index pKb in a range of preferably 3.0 to less than 11.0, more preferably 3.5 to less than 8.0. In the stabilizer composition of the present invention, the base dissociation index pKb of the hindered amine-based light stabilizer is determined as follows.

<Method of Measuring Base Dissociation Index pKb>

The hindered amine-based light stabilizer is dissolved in an 80%-by-mass methanol-containing aqueous solution, and the resulting solution is titrated with a 3N HCl aqueous solution. Based on the thus obtained pH titration curve, the pKb value is calculated by a graph method.

The content of the component (C) in the stabilizer composition of the present invention is 5 to 200 parts by mass with respect to 100 parts by mass of the component (A) and, from the standpoints of thermal stability, coloration resistance and thermal coloration resistance, the content of the component (C) is preferably 10 to 150 parts by mass, more preferably 20 to 100 parts by mass, still more preferably 30 to 80 parts by mass. The component (C) may be used individually, or two or more thereof may be used in combination.

From the standpoints of thermal stability, coloration resistance and thermal coloration resistance, the stabilizer composition of the present invention further contains at least one β-diketone compound as a component (D) in an amount of preferably 5 to 300 parts by mass, more preferably 10 to 250 parts by mass, still more preferably 20 to 200 parts by mass, with respect to 100 parts by mass of the component (A).

Examples of the β-diketone compound of the component (D) include acetylacetone, triacetylmethane, 2,4,6-heptatrione, butanoylacetylmethane, lauroylacetylmethane, palmitoylacetylmethane, stearoylbenzoylmethane, palmitoylbenzoylmethane, distearoylmethane, stearoylacetylmethane, phenylacetylacetylmethane, dicyclohexylcarbonylmethane, benzoylformylmethane, benzoylacetylmethane, dibenzoylmethane, octylbenzoylmethane, bis(4-octylbenzoyl)mathane, benzoyldiacetylmethane, 4-methoxybenzoylbenzoylmethane, bis(4-carboxymethylbenzoyl)methane, 2-carboxymethylbenzoylacetyloctylmethane, dehydroacetic acid, ethyl acetoacetate, cyclohexane-1,3-dione, methyl 3,6-dimethyl-2,4-dioxycyclohexane-1 carboxylate, 2-acetylcyclohexanone, dimedone and 2-benzoylcyclohexane, and metal salts of these compounds can also be used in the same manner. Examples of the metal salts include lithium salts, sodium salts, potassium salts, calcium salts, zinc salts, magnesium salts, and aluminum salts. Preferred examples of the metal salts include calcium acetylacetonate and zinc acetylacetonate.

The β-diketone compound of the component (D) may be used individually, or two or more thereof may be used in combination. Among these β-diketone compounds, dibenzoylmethane, stearoylbenzoylmethane and zinc acetylacetonate are preferred from the standpoints of thermal stability, coloration resistance and thermal coloration resistance.

From the standpoints of thermal stability coloration resistance and thermal coloration resistance, the stabilizer composition of the present invention further contains at least one phosphite compound as a component (E) in an amount of preferably 5 to 700 parts by mass, more preferably 50 to 600 parts by mass, still more preferably 100 to 500 parts by mass, with respect to 100 parts by mass of the component (A).

Examples of the phosphite compound of the component (E) include trialkyl phosphites, dialkyl phosphites, dialkyl monoallyl phosphites, alkyl allyl phosphites, monoalkyl diallyl phosphites, diallyl phosphites, and triallyl phosphites. In the stabilizer composition of the present invention, both a triester and a diester can be used; however, from the standpoints of thermal stability, coloration resistance and thermal coloration resistance, it is preferable to use a triester. Further, a thioester can be used as well.

Specific examples of the phosphite compound include triphenyl phosphite, tricresyl phosphite, tris(2,4-di-tert-butylphenyl)phosphite, tris(nonylphenyl)phosphite, tris(di-nonylphenyl)phosphite, tris(mono-di-mixed nonylphenyl) phosphite, tris(2,4-di-tert-butylphenyl)phosphite, diphenyl phosphite, 2,2'-methylene-bis(4,6-di-tert-butylphenyl)octyl phosphite, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, octyl diphenyl phosphite, diphenyl decyl phosphite, diphenyl(2-ethylhexyl)phosphite, di(decyl)monophenyl phosphite, diphenyl tridecyl phosphite, diphenyl(C12 to C15 mixed alkyl)phosphite, phenyl diisodecyl phosphite, phenyl-bis(isotridecyl)phosphite, triethyl phosphite, tributyl phosphite, tris(2-ethylhexyl)phosphite, tris(decyl)phosphite, trilauryl phosphite, tris(tridecyl) phosphite, trioleyl phosphite, tristearyl phosphite, diethyl phosphite, dibutyl phosphite, dilauryl phosphite, bis(2-ethylhexyl) phosphite, dioleyl phosphite, trilauryl trithiophosphite, bis(neopentyl glycol)-1,4-cyclohexane dimethyl diphosphite, bis(2,4-di-tert-butylphenyl/pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, distearylpentaerythritol diphosphite, di(nonylphenyl)pentaerythritol diphosphite, di(tridecyl)pentaerythritol diphosphite, phenyl-4,4'-isopropylidene diphenol·pentaerythritol diphosphite, tetra(C12 to 15 mixed alkyl)-4,4'-isopropylidene diphenyl diphosphite, hydrogenated-4,4'-isopropylidene diphenol polyphosphite, bis(octylphenyl)•bis[4,4'-n-butylidene-bis(2-tert-butyl-5-methyl phenol)]•1,6-hexanediol diphosphite, tetra(tridecyl)-4,4'-n-butylidene-bis(2-tert-butyl-5-methylphenyl)diphosphite, hexa(tridecyl)-1,1,3-tris(2-methyl-4-hydroxy-5-tert-butylphenyl)butane triphosphite, hexa(tridecyl)-1,1,3-tris(2-methyl-5-tert-butyl-4-hydroxyphenyl)butane triphosphite, 9,10-dihydro-9-oxa-10-phosphaphenanthrene-10-oxide, 2-butyl-2-ethylpropanediol·2,4,6-tri-tert-butylphenol monophosphite, tris[2-tert-butyl-4-(3-tert-butyl-4-hydroxy-5-methylphenylthio)-5-methylphenyl]phosphite, tetra(tridecyl)isopropylidene diphenol diphosphite, tetrakis(2,4-di-tert-butylphenyl)biphenylene diphosphite, tris(2-[(2,4,8,10-tetrakis-tert-butyldibenzo[d,f][1,3,2]dioxaphosphepin-6-yl) oxy]ethyl)amine, and phosphite of 2-ethyl-2-butylpropylene glycol and 2,4,6-tri-tert-butylphenol.

In the stabilizer composition of the present invention, as the component (E), the above-described phosphite compounds may be used individually, or two or more thereof may be used in combination. Among these phosphite compounds, from the standpoints of thermal stability, coloration resistance and thermal coloration resistance, it is preferred to use a phosphite compound having 12 to 80 carbon atoms, more preferably a phosphite compound having 12 to 46 carbon atoms, still more preferably a phosphite compound having 12 to 36 carbon atoms, particularly preferably a phosphite compound having 18 to 30 carbon atoms.

From the standpoints of thermal stability, coloration resistance and thermal coloration resistance, the stabilizer composition of the present invention further contains at least one phenolic antioxidant as a component (F) in an amount of preferably 5 to 200 parts by mass, more preferably 10 to 150 parts by mass, still more preferably 15 to 100 parts by mass, with respect to 100 parts by mass of the component (A).

Examples of the phenolic antioxidant of the component (F) include 2,6-di-tert-butyl-p-cresol, 2,6-diphenyl-4-octadecyloxyphenol, stearyl(3,5-di-tert-butyl-4-hydroxyphenyl) propionate, distearyl(3,5-di-tert-butyl-4-hydroxybenzyl) phosphonate, thiodiethylene-bis[(3,5-di-tert-butyl-4-hydroxyphenyl)propionate], 1,6-hexamethylene-bis[(3,5-di-tert-butyl-4-hydroxyphenyl)propionate], 1,6-hexamethylene-bis[(3,5-di-tert-butyl-4-hydroxyphenyl) promionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), bis[3,3-bis(4-hydroxy-3-tert-butylphenyl)butyric acid]glycol ester, 4,4'-butylidene-bis(6-tert-butyl-m-cresol), 2,2'-ethylidene-bis(4, 6-di-tert-butylphenol), 2,2'-ethylidene-bis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2, 4,6-trimethylbenzene, 1,3,5-tris[(3,5-di-tert-butyl-4-hydroxyphenyl)propionyloxyethyl]isocyanurate, tetrakis [methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[1, 1-dimethyl-2-{(3-tert-butyl-4-hydroxy-5-methylphenyl) propionyloxy}ethyl]-2,4,8,10-tetraoxaspiro[5.5]undecane, and triethylene glycol-bis[(3-tert-butyl-4-hydroxy-5-methylphenyl)propionate].

The phenolic antioxidant of the component (F) may be used individually, or two or more thereof may be used in combination. Among these phenolic antioxidants, pentaerythritol tetrakis[3-(3,5-di-tert-butyl-4-hydroxyphenyl) propionate] is preferred from the standpoints of thermal stability, coloration resistance and thermal coloration resistance.

In the stabilizer composition of the present invention, taking into consideration its thermal stability, coloration resistance and thermal coloration resistance, a hydrotalcite compound may also be incorporated as a component (G). The hydrotalcite compound of the component (G) is incorporated in an amount of preferably 10 to 500 parts by mass, more preferably 30 to 400 parts by mass, still more preferably 50 to 300 parts by mass, with respect to 100 parts by mass of the component (A). However, when the component (G) is incorporated into the stabilizer composition, care must be taken since it can cause stress whitening in a molded article of a vinyl chloride resin.

Examples of the hydrotalcite compound of the component (G) include compounds represented by the following Formula (2):

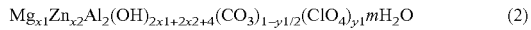

$$Mg_{x1}Zn_{x2}Al_2(OH)_{2x1+2x2+4}(CO_3)_{1-y1/2}(ClO_4)_{y1} \cdot mH_2O \quad (2)$$

where x1, x2 and y1 each represent a number that satisfies the conditions represented by the following equations, and m represents 0 or an arbitrary integer:

$$0 \leq x2/x1 < 10,\ 2 \leq (x1+x2) < 20,\ \text{and}\ 0 \leq y1 \leq 2.$$

As the hydrotalcite compound, a complex salt compound formed by magnesium and aluminum, or zinc, magnesium and aluminum is preferably used. In addition, the crystal water may be dehydrated, and the compound may be treated with perchloric acid as well. Such a hydrotalcite compound may be a naturally-occurring or synthetic hydrotalcite. The hydrotalcite compound is not restricted in terms of crystal structure, crystal particle size and the like.

Further, as the hydrotalcite compound, one whose surface is coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester or a wax, can be used as well.

The hydrotalcite compound of the component (G) may be used individually, or two or more thereof may be used in combination.

In the stabilizer composition of the present invention, taking into consideration its thermal stability, coloration resistance and thermal coloration resistance, a polyhydric alcohol compound may also be incorporated as a component (H). The polyhydric alcohol compound of the component (H) is incorporated in an amount of preferably 0.01 to 100 parts by mass, more preferably 0.1 to 75 parts by mass, still more preferably 1 to 50 parts by mass, with respect to 100 parts by mass of the component (A).

Examples of the polyhydric alcohol compound of the component (H) include pentaerythritol, dipentaerythritol, tripentaerythritol, polypentaerythritol, neopentyl glycol, trimethylolpropane, ditrimethylolpropane 1,3,5-tris(2-hydroxyethyl)isocyanurate, polyethylene glycol, glycerin, diglycerin, mannitol, maltitol lactitol, sorbitol erythritol, xylitol, xylose, sucrose, trehalose, inositol, fructose, maltose, and lactose. The polyhydric alcohol compound of the component (H) may be used individually, or two or more thereof may be used in combination.

The stabilizer composition of the present invention may also contain a solvent within a range that does not impair the effects of the present invention. From the standpoint of the solubility of the stabilizer components, the solvent is preferably an organic solvent, more preferably an organic solvent having a boiling point of 100° C. or higher, still more preferably an organic solvent having a boiling point of 120° C. or higher, particularly preferably an organic solvent having a boiling point of 150° C. or higher. Preferred examples of the organic solvent include: alcohol-based organic solvents, such as 3-methoxy-n-butanol, 2-ethylhexanol, undecanol, and tridecanol; glycol-based organic solvents, such as methyl diglycol, butyl diglycol, and methylpropylene glycol; liquid paraffin; naphthene-based solvents; normal paraffin-based solvents; isoparaffin-based solvents; and hydrocarbon-based solvents, such as aliphatic hydrocarbon solvents, aromatic hydrocarbon solvents, and mineral oil. These solvents may be used individually, or two or more thereof may be used in combination.

When a solvent is used, the amount thereof is preferably 5 to 700 parts by mass, more preferably 10 to 600 parts by mass, still more preferably 15 to 500 parts by mass, with respect to 100 parts by mass of the component (A).

In the stabilizer composition of the present invention, from the standpoints of thermal stability, coloration resistance and thermal coloration resistance, the barium content with respect to the zinc content is, in terms of molar ratio, preferably in a range of 0.1 to 20.0, more preferably in a range of 1.0 to 15.0, still more preferably in a range of 2.0 to 10.0.

The stabilizer composition of the present invention can be preferably blended with a vinyl chloride resin to be used as a vinyl chloride resin composition.

In order to obtain the stabilizer composition of the present invention, the indispensable components (A) to (C) and, as required, preferred optional components (D) to (F), the components (G) and (H) that may be incorporated as required, as well as a solvent may be mixed together, and a variety of mixing machines can be employed for the mixing. These components may be heated during the mixing. Examples of the mixing machines that can be employed include tumbler mixers, Henschel mixers, ribbon blenders, V-type mixers, W-type mixers, super mixers, and Nauta mixers. Further, the above-described components may be directly blended with a vinyl chloride resin separately, or two or more of the components may be directly blended with a vinyl chloride resin simultaneously, to prepare a vinyl chloride resin composition.

Next, the vinyl chloride resin composition of the present invention will be described.

The vinyl chloride resin is not particularly restricted by its polymerization method such as bulk polymerization, solution polymerization, suspension polymerization, or emulsion polymerization, and examples thereof include: vinyl chloride resins, such as polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride ternary copolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate ternary copolymers, vinyl chloride-maleic acid ester copolymers, vinyl chloride-methacrylic acid ester copolymers, vinyl chloride-acrylonitrile copolymers, and copolymers of vinyl chloride and various vinyl ethers; blend products of these resins; and blend products, block copolymers, graft copolymers and the like that are formed by the above-described vinyl chloride resins with other chlorine-free synthetic resin such as an acrylonitrile-styrene copolymer, an acrylonitrile-butadiene-styrene copolymer, an ethylene-vinyl acetate copolymer, an ethylene-ethyl (meth)acrylate copolymer, or a polyester. These vinyl chloride resins may be in the form of a mixture of two or more thereof, or a mixture with other synthetic resin. From the standpoints of thermal stability, coloration resistance and thermal coloration resistance, the vinyl chloride resin to be used is preferably a polyvinyl chloride.

When the stabilizer composition of the present invention is added to a vinyl chloride resin, it is preferred to further add a lubricant in consideration of the workability. The lubricant may be incorporated into the stabilizer composition before adding the stabilizer composition to the vinyl chloride resin. Examples of the lubricant include: hydrocarbon-based lubricants, such as low-molecular-weight waxes, paraffin waxes, polyethylene waxes, chlorinated hydrocarbons, and fluorocarbons; natural wax-based lubricants, such as carnauba wax and candelilla wax; fatty acid-based lubricants, such as higher fatty acids (e.g., lauric acid, stearic acid, and behenic acid) and oxy fatty acids (e.g., hydroxystearic acid); aliphatic amide-based lubricants, such as aliphatic amide compounds (e.g., stearylamide, laurylamide, and oleylamide) and alkylene bis-aliphatic amides (e.g., methylene bis-stearylamide and ethylene bis-stearylamide); fatty acid alcohol ester-based lubricants, such as fatty acid monohydric alcohol ester compounds (e.g., stearyl stearate, butyl stearate, and distearyl phthalate), fatty acid polyhydric alcohol ester compounds (e.g., glycerin tristearate, sorbitan tristearate, pentaerythritol tetrastearate, dipentaerythritol hexastearate, polyglycerin polyricinoleate, and hardened castor oil), and complex ester compounds composed of a monovalent fatty acid, a polybasic organic acid and a polyhydric alcohol (e.g., adipic acid-stearic acid ester of dipentaerythritol); aliphatic alcohol-based lubricants, such as stearyl alcohol, lauryl alcohol, and palmityl alcohol; metallic soaps; montanoic acid-based lubricants, such as partially-saponified montanoic acid esters; acrylic lubricants; and silicone oils. These lubricants may be used individually, or two or more thereof may be used in combination.

When a lubricant is added, the amount thereof is preferably 0.01 to 5.0 parts by mass with respect to 100 parts by mass of the vinyl chloride resin and, from the standpoint of the workability, it is more preferably 0.05 to 4.0 parts by mass, still more preferably 0.1 to 3.0 parts by mass.

When the stabilizer composition of the present invention is added to a vinyl chloride resin, it is preferred to further add a processing aid in consideration of the workability. The processing aid may be incorporated into the stabilizer composition before adding the stabilizer composition to the vinyl chloride resin. The processing aid can be selected as appropriate from known processing aids. Examples of the processing aid include: homopolymers or copolymers of alkyl methacrylates such as methyl methacrylate, ethyl methacrylate, and butyl methacrylate; copolymers of any of the above-described alkyl methacrylate and an alkyl acrylate such as methyl acrylate, ethyl acrylate, or butyl acrylate; copolymers of any of the above-described alkyl methacrylate and an aromatic vinyl compound such as styrene, α-methylstyrene, or vinyl toluene; and copolymers of any of the above-described alkyl methacrylate alkyl methacrylates and a vinylcyan compound such as acrylonitrile or methacrylonitrile. These processing aids may be used individually, or two or more thereof may be used in combination.

When a processing aid is added, the amount thereof is preferably 0.01 to 10 parts by mass, more preferably 0.05 to 5 parts by mass, with respect to 100 parts by mass of the vinyl chloride resin.

In addition to the stabilizer composition of the present invention, other additives that are usually used in vinyl chloride resins, such as a sulfur-based antioxidant, an epoxy compound, a plasticizer, an ultraviolet absorber, an impact modifier, a reinforcing material, a filler, a zeolite compound, a perchlorate, an organic acid metal salt, an overbased magnesium carbonate, a foaming agent, a flame retardant and a flame retardant aid, may also be added to the vinyl chloride resin within a range that does not impair the effects of the present invention. These additives may be incorporated into the stabilizer composition before adding the stabilizer composition to the vinyl chloride resin.

Examples of the sulfur-based antioxidant include dialkyl thiodipropionates, such as dilauryl thiodipropionate, dimyristyl thiodipropionate, myristylstearyl thiodipropionate, and distearyl thiodipropionate; and β-alkylmercaptopropionates of polyols, such as pentaerythritol-tetra(β-dodecylmercaptopropionate). These sulfur-based antioxidants may be used individually, or two or more thereof may be used in combination.

Examples of the epoxy compound include: epoxidized animal and plant oils, such as epoxidized soybean oil, epoxidized linseed oil, epoxidized tung oil, epoxidized fish oil, epoxidized beef tallow oil, epoxidized castor oil, and epoxidized safflower oil; epoxidized tall oil fatty acid esters, such as epoxidized tall oil fatty acid octyl; epoxidized linseed oil fatty acid ester, such as epoxidized linseed oil fatty acid butyl; epoxidized methyl stearate; epoxidized butyl stearate; epoxidized 2-ethylhexyl stearate; epoxidized stearyl stearate; epoxidized polybutadiene; tris(epoxypropyl)isocyanurate; 3-(2-xenoxy)-1,2-epoxypropane; epoxidized polybutadiene; bisphenol-A diglycidyl ether; bisphenol-type and novolac-type epoxy resins; vinylcyclohexene diepoxide; dicyclohexene diepoxide; dicyclopentadiene diepoxide; 3,4-epoxycyclohexyl-6-methylepoxycyclohexane carboxylate; bis(3,4-epoxycyclohexyl)adipate; 3,4-epoxycyclohexylmethyl; and epoxycyclohexane carboxylate. These epoxy compounds may be used individually, or two or more thereof may be used in combination.

Examples of the plasticizer include: phthalate-based plasticizers, such as dibutyl phthalate, butylhexyl phthalate, diheptyl phthalate, dioctyl phthalate, diisononyl phthalate, diisodecyl phthalate, dilauryl phthalate, dicyclohexyl phthalate, and dioctyl terephthalate; adipate-based plasticizers, such as dioctyl adipate, diisononyl adipate, diisodecyl adipate, and di(butyl diglycol)adipate; phosphate-based plasticizers, such as biphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate, and octyldiphenyl phosphate; polyester-based plasticizers in which a polyhydric alcohol (e.g., ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, or neopentyl glycol) and a dibasic acid (e.g., oxalic acid, malonic acid, succinic acid, glutaric acid, adipic acid, pimelic acid, suberic acid, azelaic acid, sebacic acid, phthalic acid, isophthalic acid, or terephthalic acid) are used along with, as required, a monohydric alcohol or a monocarboxylic acid as a stopper; tetrahydrophthalic acid-based plasticizers, azelaic acid based plasticizers, sebacic acid-based plasticizers, stearic acid-based plasticizers, citric acid-based plasticizers, trimellitic acid-based plasticizers, pyromellitic acid-based plasticizers, and biphenylene polycarboxylic acid-based plasticizers. These plasticizers may be used individually, or two or more thereof may be used in combination.

Examples of the ultraviolet absorber include 2-hydroxybenzophenones, such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2-hydroxyphenyl) benzotriazoles, such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5- chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolyl phenol), and polyethylene glycol ester of 2-(2-hydroxy-3-tert-butyl-5-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxandides, such as 2-ethyl-2'-ethoxyoxanilide and 2-ethoxy-4'-dodecyloxanilide; cyanoacrylates, such as ethyl-α-cyano-β,β-diphenylacrylate and methyl-2-cyano-3-methyl-3-(p-methoxyphenyl)acrylate; and triaryltriazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine. These ultraviolet absorbers may be used individually, or two or more thereof may be used in combination.

Examples of the impact modifier include polybutadienes, polyisoprenes, polychloroprenes, fluororubbers, styrene-butadiene-based copolymer rubbers, methyl methacrylate-butadiene-styrene-based copolymers, methyl methacrylate-butadiene-styrene-based graft copolymers, acrylonitrile-styrene-butadiene-based copolymer rubbers, acrylonitrile-styrene-butadiene-based graft copolymers, styrene-butadiene-styrene block copolymer rubbers, styrene-isoprene-styrene copolymer rubbers, styrene-ethylene-butylene-styrene copolymers rubbers, ethylene-propylene copolymer rubbers, ethylene-propylene-diene copolymer rubbers (EPDM), silicone-containing acrylic rubbers, silicone/acryl composite rubber-based graft copolymers, and silicone-based rubbers. Examples of the diene in the above-described ethylene-propylene-diene copolymer rubbers (EPDM) include 1,4-hexanediene dicyclopentadiene, methylene norbornene, ethylidene norbornene, and propenyl norbornene. These impact modifiers may be used individually, or two or more thereof may be used in combination.

As the reinforcing material, a fiber-form, plate-form, particle-form or powder-form reinforcing material that is usually used for reinforcement of a synthetic resin can be used. Specific examples thereof include: inorganic fibrous reinforcing materials, such as glass fibers, asbestos fibers, carbon fibers, graphite fibers, metal fibers, potassium titanate whiskers, aluminum borate whiskers, magnesium-based whiskers, silicon-based whiskers, wollastonite, sepiolite, asbestos, slag fibers, zonoite, ellestadite, gypsum fibers, silica fibers, silica-alumina fibers, zirconia fibers, boron nitride fibers, silicon nitride fibers, and boron fibers; organic fibrous reinforcing materials, such as polyester fibers, nylon fibers, acrylic fibers, regenerated cellulose fibers, acetate fibers, kenaf, ramie, cotton, jute, hemp, sisal, flax, linen, silk, Manila hemp, sugarcane, wood pulp, wastepaper, recycled wastepaper, and wool; and plate-form and particle-form reinforcing materials, such as glass flake, non-swelling mica, graphites, metal foils, ceramic beads, clay, mica, sericite, zeolite, bentonite, dolomite, kaolin, fine powder silicic acid, feldspar powder, potassium titanate, shirasu balloon, calcium carbonate, magnesium carbonate, barium sulfate, calcium oxide, aluminum oxide, titanium oxide, aluminum silicate, silicon oxide, gypsum, novaculite dawsonite, and white clay. These reinforcing materials may be coated or bundled with a thermoplastic resin such as an ethylene/vinyl acetate copolymer or a thermosetting resin such as an epoxy resin or may be treated with a coupling agent such as aminosilane or epoxysilane. These reinforcing materials may be used individually, or two or more thereof may be used in combination.

Examples of the filler include calcium carbonate, calcium oxide, calcium hydroxide, zinc hydroxide, zinc carbonate, zinc sulfide, magnesium oxide, magnesium hydroxide, magnesium carbonate, aluminum oxide, aluminum hydroxide, metal silicates (e.g., sodium aluminosilicate, hydrocalumite, aluminum silicate, magnesium silicate, calcium silicate, and zeolite), activated clay, talc, clay, red iron oxide, asbestos, antimony trioxide, silica, glass beads, mica, sericite, glass flake, wollastonite, potassium titanate, PMF, gypsum fibers, zonolite, MOS, phosphate fibers, glass fibers, carbon fibers, and aramid fibers. These fillers may be used individually, or two or more thereof may be used in combination.

The zeolite compound is an aluminosilicate of alkali or alkaline earth metal which has a unique three-dimensional zeolite crystal structure, and representative examples thereof include A-type, X-type, Y-type and P-type zeolites, monodenite, analcite, sodalite-family aluminosilicates, clinoptilolite, erionite, and chabazite. These zeolite compounds may each be either a hydrate containing crystal water (so-called zeolite water) or an anhydride in which the crystal water is removed, and a zeolite compound having a particle size of 0.1 to 50 μm, particularly preferably 0.5 to 10 μm, can be used. The above-described zeolite compounds may be used individually, or two or more thereof may be used in combination.

Examples of the perchlorate include metal perchlorates, ammonium perchlorate, and perchloric acid-treated silicates. Examples of the metals constituting these metal salts include lithium, sodium, potassium, calcium, magnesium, strontium, barium, zinc, cadmium, lead, and aluminum. The metal perchlorates may be anhydrides or hydrate salts and may be dissolved in an alcohol-based or ester-based solvent such as butyl diglycol or butyl diglycol adipate), or dehydrated products thereof. These perchlorates may be used individually, or two or more thereof may be used in combination.

Examples of the organic acid magnesium salt include magnesium salts of organic carboxylic acids, phenols, or organic phosphoric acids.

Examples of the organic carboxylic acids include the same ones as those exemplified above for organic acid barium salt. Examples of the phenols also include the same ones as those exemplified above for organic acid barium salt. Moreover, examples of the organic phosphoric acids include the same ones as those exemplified above for organic acid barium salt. The organic acid magnesium salt may be constituted by two or more organic acids. For example, in the case of a magnesium salt formed by monovalent organic acids, the same organic acid may constitute an anionic moiety and form a salt with divalent calcium constituting a cationic moiety, or two different monovalent organic acids may each constitute an anionic moiety and form a salt with divalent magnesium constituting a cationic moiety. Such an organic acid magnesium salt may be used individually, or two or more thereof may be used in combination. Further, the organic acid magnesium salt may be an acidic salt, a neutral salt, or a basic salt.

The term "overbased magnesium carbonate" used herein refers to a liquid overbased carboxylate-carbonate complex of magnesium. This complex, which is different from a simple mixture of normal magnesium carboxylate and magnesium carbonate, is formed by some sort of interaction therebetween and characteristically assumes a homogeneous liquid state in an organic solvent while having a high metal content. This complex is constituted by, as its constituents, normal magnesium carboxylate, magnesium carbonate and a complex salt of magnesium carboxylate and magnesium carbonate, and normal magnesium carboxylate and the complex salt of magnesium carboxylate and magnesium carbonate are centered around magnesium carbonate to form a so-called micelle-like structure, thereby allowing the complex to assume a homogeneous liquid state in an organic solvent.

Such a liquid overbased carboxylate-carbonate complex of magnesium can be produced in the same manner as the above-described liquid overbased carboxylate-carbonate complex of barium. Further, commercially available complexes can be directly used as well. These overbased magnesium carbonates may be used individually, or two or more thereof may be used in combination.

Examples of the foaming agent include: degradable organic foaming agents, such as azodicarbonamide, azobisisobutyronitrile, p,p'-oxybis-benzenesulfonylhydrazide, n,n'-dinitrosopentamethylenetetramine, p-toluenesulfonylsemicarbazide, and trihydrazotriazine; and degradable inorganic foaming agents, such as sodium bicarbonate, ammonium carbonate, ammonium bicarbonate, ammonium nitrite, azide compounds, and sodium borohydride. These foaming agents may be used individually, or two or more thereof may be used in combination.

Examples of the flame retardant and the flame retardant aid include triazine ring-containing compounds, metal hydroxides, other inorganic phosphorus compounds, halogen-based flame retardants, silicon-based flame retardants, phosphate-based flame retardants, condensed phosphate-based flame retardants, intumescent flame retardants, antimony oxides such as antimony trioxide, and other inorganic flame retardant aids and organic flame retardant aids.

Examples of the triazine ring-containing compound include melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxide include magnesium hydroxide, aluminum hydroxide, calcium hydroxide, barium hydroxide, zinc hydroxide, and KISUMA 5A (magnesium hydroxide, manufactured by Kyowa Chemical Industry Co., Ltd.).

Examples of the phosphate-based flame retardant include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris(isopropylphenyl)phosphate, 2-ethylhexyldiphenyl phosphate, t-butylphenyldiphenyl phosphate, bis(t-butylphenyl)phenyl phosphate, tris(t-butylphenyl)phosphate, isopropylphenyldiphenyl phosphate, bis(isopropylphenyl)diphenyl phosphate, and tris(isopropylphenyl)phosphate.

Examples of the condensed phosphoric acid ester-based flame retardant include 1,3-phenylene-bis(diphenylphosphate) 1,3-phenylene-bis(dixylenylphosphate) and bisphenol A-bis(diphenylphosphate), and examples of the intumescent-based flame retardant include ammonium salts and amine salts of (poly)phosphoric acid, such as ammonium polyphosphate, melamine polyphosphate, piperazine polyphosphate, ammonium pyrophosphate, melamine pyrophosphate, and piperazine pyrophosphate.

Examples of other inorganic flame retardant aid include inorganic compounds, such as titanium oxide, aluminum oxide, magnesium oxide, and talc; and surface-treated products thereof. For example, a variety of commercially available products, such as TIPAQUE R-680 (titanium oxide: manufactured by Ishihara Sangyo Kaisha, Ltd.) and KYOWAMAG 150 (magnesium oxide: manufactured by Kyowa Chemical Industry Co., Ltd.), can be used.

These flame retardants and flame retardant aids may be used individually, or two or more thereof may be used in combination.

Further, in addition to the stabilizer composition of the present invention, a stabilization aid that is usually used in vinyl chloride resins may be added within a range that does not impair the effects of the stabilizer composition of the present invention. As the stabilization aid, for example, diphenyithiourea, anilinodithiotriazine, melamine, benzoic acid, cinnamic acid, or p-tert-butylbenzoic acid can be used. Moreover, as required, additives that are usually used in vinyl chloride resins, examples of which include a cross-linking agent, an antistatic agent, an anti-fogging agent, a plate-out inhibitor, a surface treatment agent, a fluorescent agent, an antifungal agent, an antibacterial agent, a metal inactivator, a mold release agent, and a pigment such as white pigment (e.g., titanium dioxide) or blue pigment (e.g., ultramarine blue or phthalocyanine blue), may be incorporated within a range that does not impair the effects of the present invention. These optional components may be used individually, or two or more thereof may be used in combination. These stabilization aid and optional components may be incorporated into the stabilizer composition before adding the stabilizer composition to the vinyl chloride resin.

Among metallic stabilizers that are used in vinyl chloride resins, it is not preferred from the standpoints of the environmental effects and the toxicity to add a lead-based stabilizer, a (organic) tin-based stabilizer, or a cadmium-based stabilizer.

The vinyl chloride resin composition of the present invention contains a vinyl chloride resin and the above-described stabilizer composition of the present invention. In the vinyl chloride resin composition of the present invention, the content of the stabilizer composition is preferably 0.3 to 15.0 parts by mass, more preferably 0.3 to 10.0 parts by mass, still more preferably 0.5 to 8.0 parts by mass, yet still more preferably 0.8 to 6.0 parts by mass, with respect to 100 parts by mass of the vinyl chloride resin.

In the vinyl chloride resin composition of the present invention, in addition to the stabilizer composition of the present invention, the above-described lubricant and processing aid as well as other additives that are usually used in vinyl chloride resins may be incorporated within a range that does not impair the effects of the present invention.

The vinyl chloride resin composition of the present invention can be molded by a known molding method, such as roll processing, extrusion molding, melt casting, press molding, injection molding, or calender molding.

The molded article of the present invention is obtained from the vinyl chloride resin composition of the present invention. Molded articles obtained from the vinyl chloride resin composition of the present invention can be utilized in piping materials, such as pipes, joints, and piping parts; building and structural materials, such as wall materials, flooring materials, window frames, corrugated boards, and gutters; interior and exterior materials for automobiles; electric wire coating materials; agricultural materials; food packaging materials; and products, such as miscellaneous goods (e.g., packings gaskets, hoses, sheets, trays, bottles, and toys), daily necessaries, stationery, decorative panels, industrial boards, and IC casings.

EXAMPLES

The present invention will now be described concretely by way of Examples thereof. It is noted here, however, that the present invention is not restricted to the below-described Examples by any means.

[Production of Stabilizer Compositions]

Stabilizer compositions were prepared by blending various components in accordance with the respective formulations shown in Tables 1 to 5. As the hindered amine-based light stabilizer of the component (C), light stabilizers 1 to 6 having the below-described structural formulae were used. Tables 1 to 5 also show the barium content with respect to the zinc content in the respective stabilizer compositions in terms of molar ratio. Further, the base dissociation index pKb of each hindered amine-based light stabilizer of the component (C) is also shown in Tables 1 to 5.

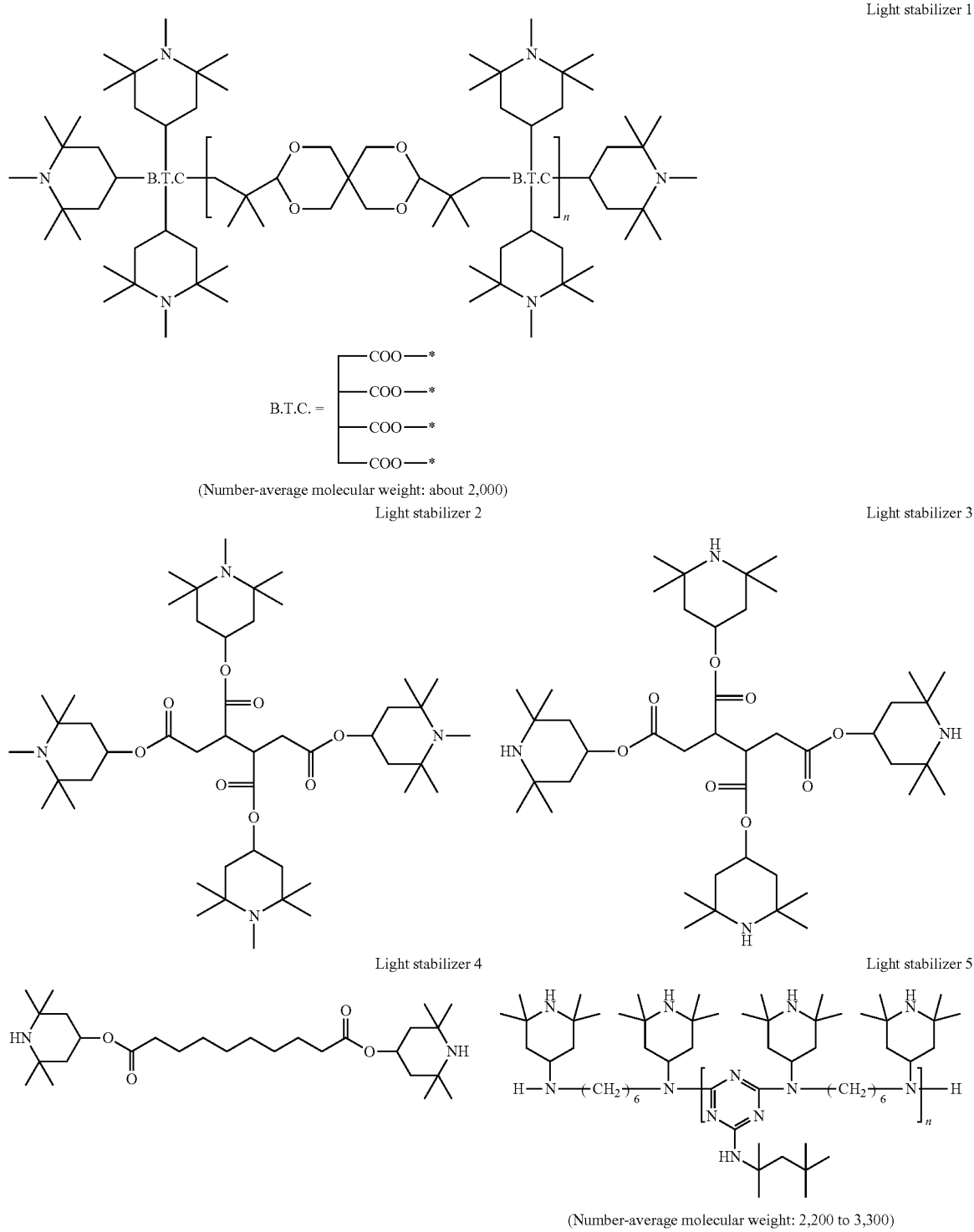

(Number-average molecular weight: about 2,000)

(Number-average molecular weight: 2,200 to 3,300)

-continued

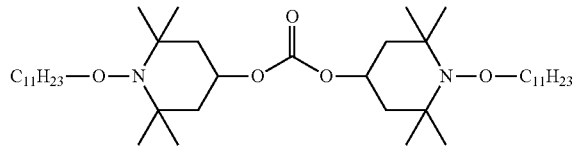

Light stabilizer 6

TABLE 1

|   | | Composition 1 | Composition 2 | Composition 3 | Composition 4 | Composition 5 |
|---|---|---|---|---|---|---|
| (A) | Zinc benzoate | 100 | 100 | 100 | 100 | 100 |
|   | Zinc toluate | — | — | — | — | — |
|   | Zinc stearate | — | — | — | — | — |
|   | Zinc laurate | — | — | — | — | — |
|   | Zinc octylate | — | — | — | — | — |
|   | Zinc versatate | — | — | — | — | — |
| (B) | Overbased barium carbonate*1 | 300 | 300 | 300 | 300 | 300 |
|   | Barium stearate | — | — | — | — | — |
|   | Overbased calcium carbonate*2 | — | — | — | — | — |
|   | Calcium stearate | — | — | — | — | — |
| (C) | Hindered amine-based light stabilizer 1*3 | 40 | 20 | 30 | 80 | 100 |
|   | Hindered amine-based light stabilizer 2*4 | — | — | — | — | — |
|   | Hindered amine-based light stabilizer 3*5 | — | — | — | — | — |
|   | Hindered amine-based light stabilizer 4*6 | — | — | — | — | — |
|   | Hindered amine-based light stabilizer 5*7 | — | — | — | — | — |
|   | Hindered amine-based light stabilizer 6*8 | — | — | — | — | — |
| (D) | Stearoylbenzoylmethane | 60 | 60 | 60 | 60 | 60 |
|   | Dibenzoylmethane | — | — | — | — | — |
|   | Zinc acetylacetonate | 10 | 20 | 70 | 20 | 20 |
| (E) | Phosphite 1*9 | 200 | 200 | 200 | 200 | 200 |
|   | Phosphite 2*10 | — | — | — | — | — |
| (F) | Phenolic antioxidant*11 | 20 | 20 | 20 | 20 | 20 |
|   | Ba/Zn (molar ratio) | 2.78 | 2.28 | 2.28 | 2.28 | 2.28 |
|   | Base dissociation index pKb of component (C) | 6.3 | 6.3 | 6.3 | 6.3 | 6.3 |

TABLE 2

|   | | Composition 6 | Composition 7 | Composition 8 | Composition 9 | Composition 10 |
|---|---|---|---|---|---|---|
| (A) | Zinc benzoate | 100 | 100 | 100 | 100 | 100 |
|   | Zinc toluate | — | — | — | — | — |
|   | Zinc stearate | — | — | — | — | — |
|   | Zinc laurate | — | — | — | — | — |
|   | Zinc octylate | — | — | — | — | — |
|   | Zinc versatate | — | — | — | — | — |
| (B) | Overbased barium carbonate*1 | 300 | 300 | 300 | 300 | 300 |
|   | Barium stearate | — | — | — | — | — |
|   | Overbased calcium carbonate*2 | — | — | — | — | — |
|   | Calcium stearate | — | — | — | — | — |
| (C) | Hindered amine-based light stabilizer 1*3 | — | — | — | — | — |
|   | Hindered amine-based light stabilizer 2*4 | 40 | — | — | — | — |
|   | Hindered amine-based light stabilizer 3*5 | — | 40 | — | — | — |
|   | Hindered amine-based light stabilizer 4*6 | — | — | 40 | — | — |

TABLE 2-continued

|   |   | Composition 6 | Composition 7 | Composition 8 | Composition 9 | Composition 10 |
|---|---|---|---|---|---|---|
|   | Hindered amine-based light stabilizer 5*[7] | — | — | — | 40 | — |
|   | Hindered amine-based light stabilizer 6*[8] | — | — | — | — | 40 |
| (D) | Stearoylbenzoylmethane | 60 | 60 | 60 | 60 | 60 |
|   | Dibenzoylmethane | — | — | — | — | — |
|   | Zinc acetylacetonate | 20 | 20 | 20 | 20 | 20 |
| (E) | Phosphite 1*[9] | 200 | 200 | 200 | 200 | 200 |
|   | Phosphite 2*[10] | — | — | — | — | — |
| (F) | Phenolic antioxidant*[11] | 20 | 20 | 20 | 20 | 20 |
|   | Ba/Zn (molar ratio) | 2.28 | 2.28 | 2.28 | 2.28 | 2.28 |
|   | Base dissociation index pKb of component (C) | 5.8 | 5.7 | 5.3 | 4.6 | 11.3 |

TABLE 3

|   |   | Composition 11 | Composition 12 | Composition 13 | Composition 14 | Composition 15 |
|---|---|---|---|---|---|---|
| (A) | Zinc benzoate | — | 50 | — | 50 | 50 |
|   | Zinc toluate | — | 50 | — | 50 | 50 |
|   | Zinc stearate | 100 | — | 100 | — | — |
|   | Zinc laurate | — | — | — | — | — |
|   | Zinc octylate | — | — | — | — | — |
|   | Zinc versatate | — | — | — | — | — |
| (B) | Overbased barium carbonate*[1] | 300 | — | — | — | — |
|   | Barium stearate | — | 400 | 400 | — | — |
|   | Overbased calcium carbonate*[2] | — | — | — | 300 | — |
|   | Calcium stearate | — | — | — | — | 400 |
| (C) | Hindered amine-based light stabilizer 1*[3] | 40 | 40 | 40 | 40 | 40 |
|   | Hindered amine-based light stabilizer 2*[4] | — | — | — | — | — |
|   | Hindered amine-based light stabilizer 3*[5] | — | — | — | — | — |
|   | Hindered amine-based light stabilizer 4*[6] | — | — | — | — | — |
|   | Hindered amine-based light stabilizer 5*[7] | — | — | — | — | — |
|   | Hindered amine-based light stabilizer 6*[8] | — | — | — | — | — |
| (D) | Stearoylbenzoylmethane | 60 | 60 | 60 | 60 | 60 |
|   | Dibenzoylmethane | — | — | — | — | — |
|   | Zinc acetylacetonate | 20 | 20 | 20 | 20 | 20 |
| (E) | Phosphite 1*[9] | 200 | 200 | 200 | 200 | 200 |
|   | Phosphite 2*[10] | — | — | — | — | — |
| (F) | Phenolic antioxidant*[11] | 20 | 20 | 20 | 20 | 20 |
|   | Ba/Zn (molar ratio) | 5.87 | 1.82 | 3.59 | — | — |
|   | Base dissociation index pKb of component (C) | 6.3 | 6.3 | 6.3 | 6.3 | 6.3 |

TABLE 4

|   |   | Composition 16 | Composition 17 | Composition 18 | Composition 19 | Composition 20 |
|---|---|---|---|---|---|---|
| (A) | Zinc benzoate | 50 | 50 | 100 | 100 | 100 |
|   | Zinc toluate | 50 | 50 | — | — | — |
|   | Zinc stearate | — | — | — | — | — |
|   | Zinc laurate | — | — | — | — | — |
|   | Zinc octylate | — | — | — | — | — |
|   | Zinc versatate | — | — | — | — | — |

TABLE 4-continued

|   | | Composition 16 | Composition 17 | Composition 18 | Composition 19 | Composition 20 |
|---|---|---|---|---|---|---|
| (B) | Overbased barium carbonate*1 | 200 | 400 | 300 | 300 | 300 |
|  | Barium stearate | — | — | — | — | — |
|  | Overbased calcium carbonate*2 | — | — | — | — | — |
|  | Calcium stearate | — | — | — | — | — |
| (C) | Hindered amine-based light stabilizer 1*3 | 40 | 40 | 40 | 40 | — |
|  | Hindered amine-based light stabilizer 2*4 | — | — | — | — | — |
|  | Hindered amine-based light stabilizer 3*5 | — | — | — | — | — |
|  | Hindered amine-based light stabilizer 4*6 | — | — | — | — | — |
|  | Hindered amine-based light stabilizer 5*7 | — | — | — | — | — |
|  | Hindered amine-based light stabilizer 6*8 | — | — | — | — | — |
| (D) | Stearoylbenzoylmethane | 60 | 60 | — | 60 | 60 |
|  | Dibenzoylmethane | — | — | 60 | — | — |
|  | Zinc acetylacetonate | 20 | 20 | 20 | 20 | 20 |
| (E) | Phosphite 1*9 | 200 | 200 | 200 | — | 200 |
|  | Phosphite 2*10 | — | — | — | 200 | — |
| (F) | Phenolic antioxidant*11 | 20 | 20 | 20 | 20 | 20 |
|  | Ba/Zn (molar ratio) | 1.99 | 3.98 | 2.28 | 2.28 | 2.28 |
|  | Base dissociation index pKb of component (C) | 6.3 | 6.3 | 6.3 | 6.3 | — |

TABLE 5

|   | | Composition 21 | Composition 22 | Composition 23 |
|---|---|---|---|---|
| (A) | Zinc benzoate | — | — | — |
|  | Zinc toluate | — | — | — |
|  | Zinc stearate | — | — | — |
|  | Zinc laurate | 100 | — | — |
|  | Zinc octylate | — | 100 | — |
|  | Zinc versatate | — | — | 100 |
| (B) | Overbased barium carbonate*1 | 300 | 300 | 100 |
|  | Barium stearate | — | — | — |
|  | Overbased calcium carbonate*2 | — | — | — |
|  | Calcium stearate | — | — | — |
| (C) | Hindered amine-based light stabilizer 1*3 | 40 | 40 | 40 |
|  | Hindered amine-based light stabilizer 2*4 | — | — | — |
|  | Hindered amine-based light stabilizer 3*5 | — | — | — |
|  | Hindered amine-based light stabilizer 4*6 | — | — | — |
|  | Hindered amine-based light stabilizer 5*7 | — | — | — |
|  | Hindered amine-based light stabilizer 6*8 | — | — | — |
| (D) | Stearoylbenzoylmethane | 60 | 60 | 60 |
|  | Dibenzoylmethane | — | — | — |
|  | Zinc acetylacetonate | 20 | 20 | 20 |
| (E) | Phosphite 1*9 | 200 | 200 | 200 |
|  | Phosphite 2*10 | — | — | — |
| (F) | Phenolic antioxidant*11 | 20 | 20 | 20 |
|  | Ba/Zu (molar ratio) | 3.51 | 3.57 | 3.61 |
|  | Base dissociation index pKb of component (C) | 6.3 | 6.3 | 6.3 |

[1]: overbased barium oleate-carbonate complex

[2]: overbased calcium oleate-carbonate complex

[3]: ADK STAB LA-63P (manufactured by ADEKA Corporation)

[4]: ADK STAB LA 52 (manufactured by ADEKA Corporation)

[5]: ADK STAB LA-57 (manufactured by ADEKA Corporation)

[6]: ADK STAB LA-77Y (manufactured by ADEKA Corporation)

[7]: ADK STAB LA-94G (manufactured by ADEKA Corporation)

[8]: ADK STAB LA-81 (manufactured by ADEKA Corporation)

[9]: decyldiphenyl phosphite

[10]: tridecyl phosphite

[11]: pentaerythritol tetrakis[3-(3,5-di-tert-butyl-4-hydroxyphenyl)propionate] (manufactured by ADEKA Corporation, trade name: ADK STAB AO-60)

Preparation and Evaluation of Vinyl Chloride Resin Compositions: Examples 1 to 24 and Comparative Examples 1 to 3

A vinyl chloride resin, a stabilizer composition and other additives were blended using a Henschel mixer in accordance with the respective formulations shown in Tables 6 to 11. As a result, vinyl chloride resin compositions according to the present invention (Examples 1 to 24) and vinyl chloride resin compositions for comparison (Comparative Examples 1 to 3) were obtained. The thus obtained vinyl chloride resin compositions were calender-molded to produce sheets. The roll kneading conditions were set as 180° C.×30 rpm×0.6 mm. The thus obtained sheets were each evaluated by the following test methods.

<Thermal Stability Test>

The sheets were each placed in gear ovens set at 190° C. and 200° C., and the blackening time (minutes) was measured. The evaluation results are shown together in Tables 6 to 11. It is regarded that a longer blackening time means superior thermal stability.

<Coloration Resistance>

The above-obtained sheets of 0.6 mm in thickness were each pasted together and then pressed at 190° C. for 5 minutes to produce a sheet of 1 mm in thickness. The yellowness (Y.I. value) of this sheet was measured in accordance with JIS K7373. The evaluation results are shown together in Tables 6 to 11. It is regarded that a smaller yellowness value means less coloration and thus superior coloration resistance with limited initial coloration.

<Thermal Coloration Resistance Test>

The above-obtained sheets of 0.6 mm in thickness were each pasted together and then pressed at 190° C. for 30 minutes to produce a sheet of 1 mm in thickness. Further, the above-obtained sheets of 0.6 mm in thickness were each pasted together and then pressed at 190° C. for 50 minutes to produce a sheet of 1 mm in thickness. For these sheets, the yellowness (Y.I. value) was measured in accordance with JIS K7373. The evaluation results are shown together in Tables 6 to 11. It is regarded that a smaller yellowness value means less coloration and thus superior thermal coloration resistance. A larger yellowness value means inferior thermal coloration resistance, and a sheet having even a larger yellowness value was blackened.

<Transparency Test>

In the course of the evaluation by the above thermal coloration resistance test, the haze value was measured for each 1 mm-thick sheet obtained by pressing at 190° C. for 5 minutes. The evaluation results are shown together in Tables 6 to 11.

TABLE 6

| | | Example 1 | Example 2 | Example 3 | Example 4 | Example 5 |
|---|---|---|---|---|---|---|
| Polyvinyl chloride[*12] | | 100 | 100 | 100 | 100 | 100 |
| Composition 1 | | 3.7 | 3.0 | 7.0 | — | — |
| Composition 2 | | — | — | — | 3.7 | — |
| Composition 3 | | — | — | — | — | 3.7 |
| Composition 4 | | — | — | — | — | — |
| Composition 5 | | — | — | — | — | — |
| Composition 6 | | — | — | — | — | — |
| Composition 7 | | — | — | — | — | — |
| Composition 8 | | — | — | — | — | — |
| Composition 9 | | — | — | — | — | — |
| Composition 10 | | — | — | — | — | — |
| Composition 11 | | — | — | — | — | — |
| Composition 12 | | — | — | — | — | — |
| Composition 13 | | — | — | — | — | — |
| Composition 14 | | — | — | — | — | — |
| Composition 15 | | — | — | — | — | — |
| Composition 16 | | — | — | — | — | — |
| Composition 17 | | — | — | — | — | — |
| Composition 18 | | — | — | — | — | — |
| Composition 19 | | — | — | — | — | — |
| Composition 20 | | — | — | — | — | — |
| Composition 21 | | — | — | — | — | — |
| Composition 22 | | — | — | — | — | — |
| Composition 23 | | — | — | — | — | — |
| Processing aid[*13] | | 1.5 | 1.5 | 1.5 | 1.5 | 1.5 |
| Lubricant[*14] | | 1.0 | 1.0 | 1.0 | 1.0 | 1.0 |
| Thermal stability (blackening time: min) | 190° C. | 120 | 105 | 180 | 105 | 120 |
| | 200° C. | 60 | 60 | 120 | 60 | 60 |
| Coloration resistance (Y.I.) | | 9.7 | 9.7 | 13.0 | 9.6 | 9.6 |
| Thermal coloration resistance (Y.I.) | 190° C. × 30 minutes | 28.6 | 28.7 | 30.1 | 28.8 | 28.9 |
| | 190° C. × 50 minutes | 84.0 | 165.1 | 60.5 | blackened | 100.2 |
| Transparency: Haze value (%) | | 1.95 | 1.93 | 3.20 | 1.91 | 1.99 |

TABLE 7

| | | Example 6 | Example 7 | Example 8 | Example 9 | Example 10 |
|---|---|---|---|---|---|---|
| Polyvinyl chloride[*12] | | 100 | 100 | 100 | 100 | 100 |
| Composition 1 | | — | — | — | — | — |
| Composition 2 | | — | — | — | — | — |
| Composition 3 | | — | — | — | — | — |
| Composition 4 | | 3.7 | — | — | — | — |
| Composition 5 | | — | 3.7 | — | — | — |
| Composition 6 | | — | — | 3.7 | — | — |
| Composition 7 | | — | — | — | 3.7 | — |
| Composition 8 | | — | — | — | — | 3.7 |
| Composition 9 | | — | — | — | — | — |
| Composition 10 | | — | — | — | — | — |
| Composition 11 | | — | — | — | — | — |
| Composition 12 | | — | — | — | — | — |
| Composition 13 | | — | — | — | — | — |
| Composition 14 | | — | — | — | — | — |
| Composition 15 | | — | — | — | — | — |
| Composition 16 | | — | — | — | — | — |
| Composition 17 | | — | — | — | — | — |
| Composition 18 | | — | — | — | — | — |
| Composition 19 | | — | — | — | — | — |
| Composition 20 | | — | — | — | — | — |
| Composition 21 | | — | — | — | — | — |
| Composition 22 | | — | — | — | — | — |
| Composition 23 | | — | — | — | — | — |
| Processing aid[*13] | | 1.5 | 1.5 | 1.5 | 1.5 | 1.5 |
| Lubricant[*14] | | 1.0 | 1.0 | 1.0 | 1.0 | 1.0 |
| Thermal stability (blackening time: min) | 190° C. | 135 | 120 | 135 | 120 | 105 |
| | 200° C. | 75 | 60 | 75 | 60 | 60 |
| Coloration resistance (Y.I.) | | 10.1 | 10.2 | 11.4 | 12.1 | 11.2 |
| Thermal coloration resistance (Y.I.) | 190° C. × 30 minutes | 29.9 | 31.0 | 35.8 | 41.0 | 49.6 |
| | 190° C. × 50 minutes | 161.9 | blackened | 78.4 | blackened | blackened |
| Transparency: Haze value (%) | | 1.84 | 2.15 | 2.19 | 3.29 | 3.11 |

TABLE 8

| | | Example 11 | Example 12 | Example 13 | Example 14 | Example 15 |
|---|---|---|---|---|---|---|
| Polyvinyl chloride[*12] | | 100 | 100 | 100 | 100 | 100 |
| Composition 1 | | — | — | — | — | — |
| Composition 2 | | — | — | — | — | — |
| Composition 3 | | — | — | — | — | — |
| Composition 4 | | — | — | — | — | — |
| Composition 5 | | — | — | — | — | — |
| Composition 6 | | — | — | — | — | — |
| Composition 7 | | — | — | — | — | — |
| Composition 8 | | — | — | — | — | — |
| Composition 9 | | 3.7 | — | — | — | — |
| Composition 10 | | — | 3.7 | — | — | — |
| Composition 11 | | — | — | 3.7 | — | — |
| Composition 12 | | — | — | — | 3.7 | — |
| Composition 13 | | — | — | — | — | 3.7 |
| Composition 14 | | — | — | — | — | — |
| Composition 15 | | — | — | — | — | — |
| Composition 16 | | — | — | — | — | — |
| Composition 17 | | — | — | — | — | — |
| Composition 18 | | — | — | — | — | — |
| Composition 19 | | — | — | — | — | — |
| Composition 20 | | — | — | — | — | — |
| Composition 21 | | — | — | — | — | — |
| Composition 22 | | — | — | — | — | — |
| Composition 23 | | — | — | — | — | — |
| Processing aid[*13] | | 1.5 | 1.5 | 1.5 | 1.5 | 1.5 |
| Lubricant[*14] | | 1.0 | 1.0 | 1.0 | 1.0 | 1.0 |
| Thermal stability (blackening time: min) | 190° C. | 120 | 90 | 120 | 90 | 90 |
| | 200° C. | 60 | 45 | 60 | 45 | 45 |

TABLE 8-continued

|  |  | Example 11 | Example 12 | Example 13 | Example 14 | Example 15 |
|---|---|---|---|---|---|---|
| Coloration resistance (Y.I.) | | 12.9 | 11.9 | 10.5 | 14.2 | 15.5 |
| Thermal coloration resistance (Y.I.) | 190° C. × 30 minutes | 40.9 | blackened | 30.1 | 52.6 | 58.2 |
| | 190° C. × 50 minutes | 91.8 | blackened | 95.5 | blackened | blackened |
| Transparency: Haze value (%) | | 2.03 | 2.43 | 6.53 | 12.5 | 12.89 |

TABLE 9

|  |  | Example 16 | Example 17 | Example 18 | Example 19 | Example 20 |
|---|---|---|---|---|---|---|
| Polyvinyl chloride*12 | | 100 | 100 | 100 | 100 | 100 |
| Composition 1 | | — | — | — | — | — |
| Composition 2 | | — | — | — | — | — |
| Composition 3 | | — | — | — | — | — |
| Composition 4 | | — | — | — | — | — |
| Composition 5 | | — | — | — | — | — |
| Composition 6 | | — | — | — | — | — |
| Composition 7 | | — | — | — | — | — |
| Composition 8 | | — | — | — | — | — |
| Composition 9 | | — | — | — | — | — |
| Composition 10 | | — | — | — | — | — |
| Composition 11 | | — | — | — | — | — |
| Composition 12 | | — | — | — | — | — |
| Composition 13 | | — | — | — | — | — |
| Composition 14 | | 7.5 | — | — | — | — |
| Composition 15 | | — | 9.7 | — | — | — |
| Composition 16 | | — | — | 3.7 | — | — |
| Composition 17 | | — | — | — | 3.7 | — |
| Composition 18 | | — | — | — | — | 3.7 |
| Composition 19 | | — | — | — | — | — |
| Composition 20 | | — | — | — | — | — |
| Composition 21 | | — | — | — | — | — |
| Composition 22 | | — | — | — | — | — |
| Composition 23 | | — | — | — | — | — |
| Processing aid*13 | | 1.5 | 1.5 | 1.5 | 1.5 | 1.5 |
| Lubricant*14 | | 1.0 | 1.0 | 1.0 | 1.0 | 1.0 |
| Thermal stability (blackening time: min) | 190° C. | 120 | 105 | 105 | 150 | 105 |
| | 200° C. | 75 | 60 | 60 | 75 | 60 |
| Coloration resistance (Y.I.) | | 14.0 | 63.1 | 12.2 | 13.5 | 9.9 |
| Thermal coloration resistance (Y.I.) | 190° C. × 30 minutes | 75.8 | 127.3 | 188.1 | 29.5 | 29.1 |
| | 190° C. × 50 minutes | blackened | blackened | blackened | 90.1 | 88.5 |
| Transparency: Haze value (%) | | 33.2 | 40.3 | 2.11 | 2.55 | 2.04 |

TABLE 10

|  |  | Example 21 | Comparative Example 1 | Comparative Example 2 | Comparative Example 3 |
|---|---|---|---|---|---|
| Polyvinyl chloride*12 | | 100 | 100 | 100 | 100 |
| Composition 1 | | — | — | — | — |
| Composition 2 | | — | — | — | — |
| Composition 3 | | — | — | — | — |
| Composition 4 | | — | — | — | — |
| Composition 5 | | — | — | — | — |
| Composition 6 | | — | — | — | — |
| Composition 7 | | — | — | — | — |
| Composition 8 | | — | — | — | — |
| Composition 9 | | — | — | — | — |
| Composition 10 | | — | — | — | — |
| Composition 11 | | — | — | — | — |
| Composition 12 | | — | — | — | — |
| Composition 13 | | — | — | — | — |
| Composition 14 | | — | — | — | — |
| Composition 15 | | — | — | — | — |
| Composition 16 | | — | — | — | — |
| Composition 17 | | — | — | — | — |
| Composition 18 | | — | — | — | — |
| Composition 19 | | 3.7 | — | — | — |
| Composition 20 | | — | 3.7 | 5.0 | 7.0 |
| Composition 21 | | — | — | — | — |
| Composition 22 | | — | — | — | — |
| Composition 23 | | — | — | — | — |
| Processing aid*13 | | 1.5 | 1.5 | 1.5 | 1.5 |
| Lubricant*14 | | 1.0 | 1.0 | 1.0 | 1.0 |
| Thermal stability (blackening time: min) | 190° C. | 120 | 60 | 90 | 105 |
| | 200° C. | 60 | 45 | 60 | 75 |
| Coloration resistance (Y.I.) | | 10.2 | 12.3 | 14.2 | 16.5 |
| Thermal coloration resistance (Y.I.) | 190° C. × 30 minutes | 30.2 | blackened | blackened | 75.7 |
| | 190° C. × 50 minutes | 90.5 | blackened | blackened | blackened |
| Transparency: Haze value (%) | | 2.55 | 2.27 | 3.33 | 4.21 |

TABLE 11

|  |  | Example 22 | Example 23 | Example 24 |
|---|---|---|---|---|
| Polyvinyl chloride*12 | | 100 | 100 | 100 |
| Composition 1 | | — | — | — |
| Composition 2 | | — | — | — |
| Composition 3 | | — | — | — |
| Composition 4 | | — | — | — |
| Composition 5 | | — | — | — |
| Composition 6 | | — | — | — |
| Composition 7 | | — | — | — |
| Composition 8 | | — | — | — |
| Composition 9 | | — | — | — |
| Composition 10 | | — | — | — |
| Composition 11 | | — | — | — |
| Composition 12 | | — | — | — |
| Composition 13 | | — | — | — |
| Composition 14 | | — | — | — |
| Composition 15 | | — | — | — |
| Composition 16 | | — | — | — |
| Composition 17 | | — | — | — |
| Composition 18 | | — | — | — |
| Composition 19 | | — | — | — |
| Composition 20 | | — | — | — |
| Composition 21 | | 3.7 | — | — |
| Composition 22 | | — | 3.7 | — |
| Composition 23 | | — | — | 3.7 |
| Processing aid*13 | | 1.5 | 1.5 | 1.5 |
| Lubricant*14 | | 1.0 | 1.0 | 1.0 |
| Thermal stability (blackening time: min) | 190° C. | 120 | 120 | 120 |
| | 200° C. | 60 | 60 | 60 |
| Coloration resistance (Y.I.) | | 11.1 | 10.5 | 10.1 |
| Thermal coloration resistance (Y.I.) | 190° C. × 30 minutes | 32.6 | 30.9 | 29.9 |
| | 190° C. × 50 minutes | 103.4 | 110.1 | 95.6 |
| Transparency: Haze value (%) | | 5.52 | 6.47 | 4.33 |

[12]: TK-700 (polymerization degree=700), manufactured by Shin-Etsu Chemical Co., Ltd.

[13]: acrylic processing aid (KANEACE PA-20, manufactured by Kaneka Corporation)

[14]: complex ester-based internal lubricant (LOXIOL G72, manufactured by Emery Oleochemicals Japan, Ltd.)

From the results shown in Tables 6 to 11, it was confirmed that the stabilizer composition of the present invention can impart a vinyl chloride resin with excellent thermal stability, coloration resistance, and thermal coloration resistance. It was also confirmed that, in applications where transparency is required, the stabilizer composition of the present invention can provide excellent transparency.

In addition, it was confirmed that the vinyl chloride resin composition of the present invention can provide a molded article having excellent thermal stability, coloration resistance, and thermal coloration resistance. Moreover, it was confirmed that, in applications where transparency is required, the vinyl chloride resin composition of the present invention can provide a molded article having excellent transparency.

The invention claimed is:

1. A stabilizer composition comprising, with respect to 100 parts by mass of a component (A):
   200 to 700 parts by mass of a component (B); and
   20 to 100 parts by mass of a component (C),
   wherein
   the component (A) is at least one organic acid zinc salt,
   the component (B) is at least one overbased barium carbonate, and
   the component (C) is at least one hindered amine-based light stabilizer having a base dissociation index pKb in a range of 5.8 to 6.3 selected from the group consisting of the following Light stabilizer 1 and the following Light stabilizer 2:

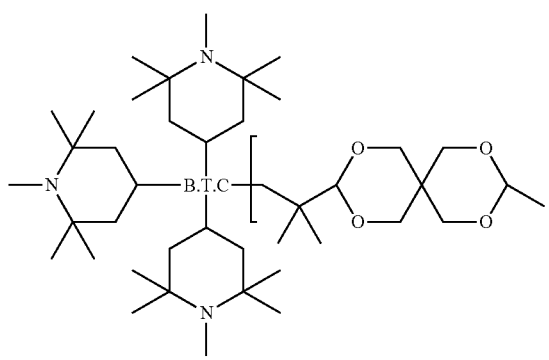

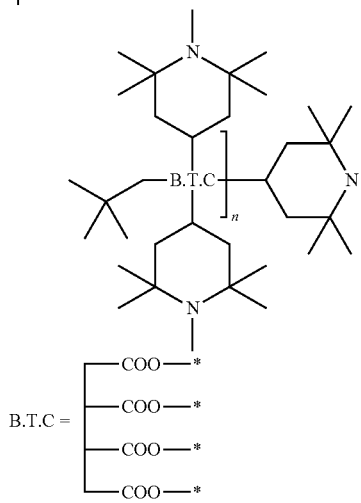

Light stabilizer 1 (Number-average molecular weight: about 2,000)

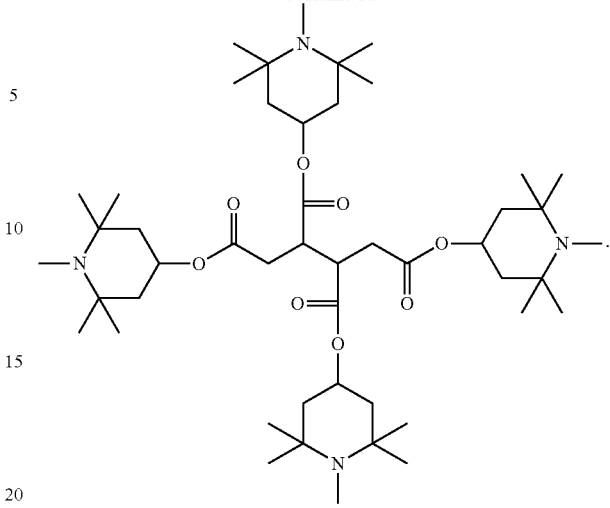

Light stabilizer 2

2. The stabilizer composition according to claim 1, further comprising 5 to 300 parts by mass of at least one β-diketone compound as a component (D) with respect to 100 parts by mass of the component (A).

3. The stabilizer composition according to claim 2, further comprising 5 to 700 parts by mass of at least one phosphite compound as a component (E) with respect to 100 parts by mass of the component (A).

4. The stabilizer composition according to claim 2, further comprising 5 to 200 parts by mass of at least one phenolic antioxidant as a component (F) with respect to 100 parts by mass of the component (A).

5. The stabilizer composition according to claim 1, further comprising 5 to 700 parts by mass of at least one phosphite compound as a component (E) with respect to 100 parts by mass of the component (A).

6. The stabilizer composition according to claim 5, further comprising 5 to 200 parts by mass of at least one phenolic antioxidant as a component (F) with respect to 100 parts by mass of the component (A).

7. The stabilizer composition according to claim 1, further comprising 5 to 200 parts by mass of at least one phenolic antioxidant as a component (F) with respect to 100 parts by mass of the component (A).

8. The stabilizer composition according to claim 1, wherein the barium content in the component (B) with respect to the zinc content in the component (A) is in a range of 0.1 to 20.0 in terms of molar ratio.

9. A vinyl chloride resin composition, comprising:
   a vinyl chloride resin; and
   the stabilizer composition according to claim 1.

10. The vinyl chloride resin composition according to claim 9, wherein the content of the stabilizer composition is 0.3 to 15.0 parts by mass with respect to 100 parts by mass of the vinyl chloride resin.

11. A molded article obtained from the vinyl chloride resin composition according to claim 9.

* * * * *